(12) United States Patent
Virant

(10) Patent No.: US 12,030,583 B2
(45) Date of Patent: Jul. 9, 2024

(54) THREE-WHEELED ELECTRIC VEHICLE

(71) Applicant: Robert Virant, Ljubljana (SI)

(72) Inventor: Robert Virant, Ljubljana (SI)

(*) Notice: Subject to any disclaimer, the term of this patent is extended or adjusted under 35 U.S.C. 154(b) by 0 days.

(21) Appl. No.: 17/991,005

(22) Filed: Nov. 21, 2022

(65) Prior Publication Data
US 2023/0125006 A1    Apr. 20, 2023

Related U.S. Application Data

(63) Continuation of application No. PCT/EP2021/000076, filed on Jul. 1, 2021.

(30) Foreign Application Priority Data

Jul. 16, 2020  (DE) .......................... 102020004287.2

(51) Int. Cl.
| | |
|---|---|
| *B62K 5/027* | (2013.01) |
| *B62J 9/27* | (2020.01) |
| *B62J 45/20* | (2020.01) |
| *B62K 5/06* | (2006.01) |
| *B62K 23/04* | (2006.01) |

(Continued)

(52) U.S. Cl.
CPC .................. *B62K 5/027* (2013.01); *B62J 9/27* (2020.02); *B62J 45/20* (2020.02); *B62K 5/06* (2013.01); *B62K 23/04* (2013.01); *B62K 25/08* (2013.01); *B62L 1/005* (2013.01); *B62L 3/02* (2013.01); *B62M 7/12* (2013.01); *B62K 2204/00* (2013.01)

(58) Field of Classification Search
CPC .......... B62K 5/027; B62K 5/06; B62K 23/04; B62K 7/04; B62K 2206/00; B62L 3/02; B62L 1/005; B62L 1/00; B62J 7/04

USPC ......................................... 224/42.4; 248/503
See application file for complete search history.

(56) References Cited

FOREIGN PATENT DOCUMENTS

| | | | |
|---|---|---|---|
| CN | 106275183 A | * 1/2017 | ............. B60G 11/04 |
| DE | 202015102839 U1 | * 10/2016 | |

(Continued)

OTHER PUBLICATIONS

Artac, DE-102019003129-B3, Machine Translation of Specification (Year: 2020).*

(Continued)

*Primary Examiner* — Amy R Weisberg
*Assistant Examiner* — Matthew Joseph Ganci
(74) *Attorney, Agent, or Firm* — Von Rohrscheidt Patents

(57) ABSTRACT

A three-wheeled electric vehicle in accordance with EU vehicle classification L2e-U, which has two electric-motor-driven rear wheels, each of which is driven by one wheel-hub motor. A hydraulically actuatable rear-wheel disc-brake system is mounted on each rear wheel which brake system is also fitted with an integrated electromechanical parking brake, the activation of which shifts each rear wheel into a parking-brake mode in which wheel rotation is prevented. In a rear portion, the vehicle body forms a support structure on which an optionally present, exchangeable transport container can be supported and secured with the aid of a quick-release fastening system. The quick-release fastening system includes one or more connection device(s), wherein each connection device includes a bar that protrudes from a bottom wall of the transport container; and a locking device, which is permanently attached to the support structure, is fitted with a movable blocking element.

18 Claims, 19 Drawing Sheets

(51) Int. Cl.
  *B62K 25/08*  (2006.01)
  *B62L 1/00*  (2006.01)
  *B62L 3/02*  (2006.01)
  *B62M 7/12*  (2006.01)

(56) References Cited

FOREIGN PATENT DOCUMENTS

| DE | 102019003129 B3 | * | 6/2020 | ........... B60K 7/0007 |
| FR | 2977229 A1 | * | 1/2013 | ............... B62K 5/02 |

OTHER PUBLICATIONS

Buisson, FR-2977229-A1, Machine Translation of Specification (Year: 2013).*
Gao, CN-106275183-A, Machine Translation of Specification (Year: 2017).*
Zweirad, DE-202015102839-U1, Machine Translation of Specification (Year: 2016).*

* cited by examiner

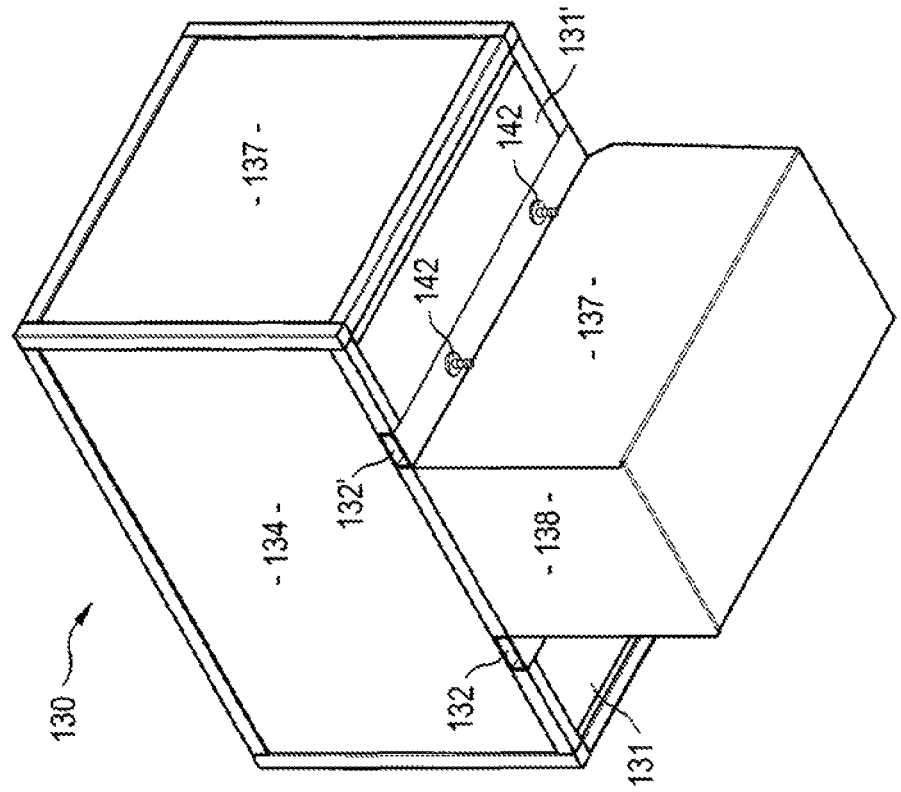
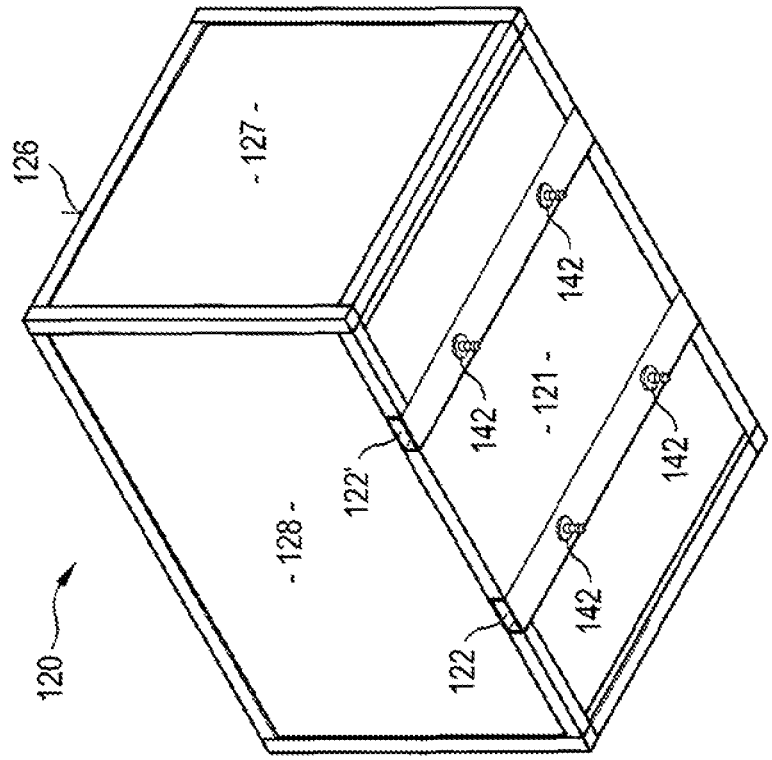
FIG. 5B
FIG. 5A

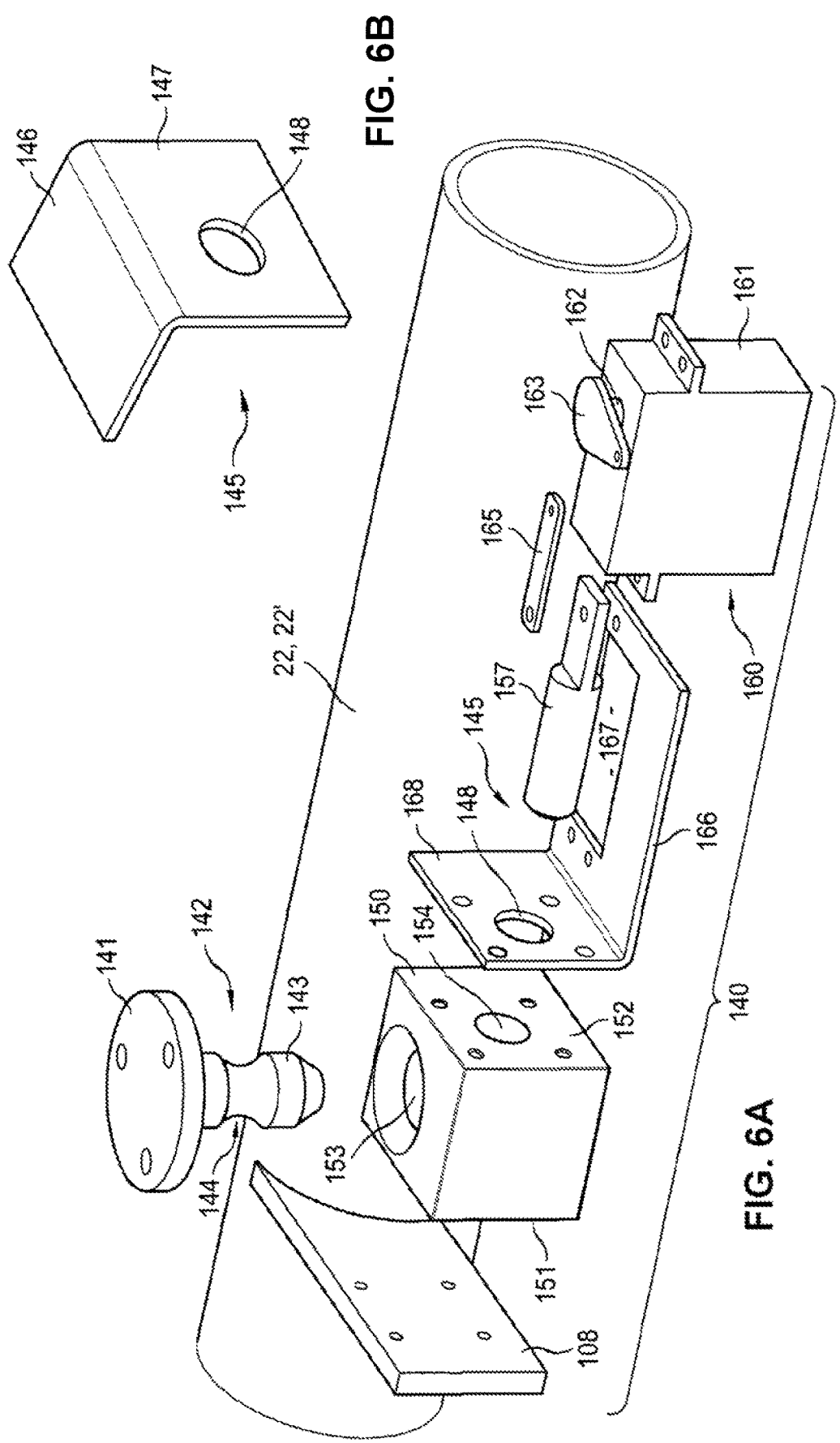

THREE-WHEELED ELECTRIC VEHICLE

RELATED APPLICATIONS

This application is a continuation of International Patent Application PCT/EP2021/000076 filed on Jul. 1, 2021 claiming priority from German Patent Application DE 10 2020 004 287.2 filed on Jul. 16, 2020, both of which are incorporated in their entirety by this reference.

FIELD OF THE INVENTION

The invention relates to a three-wheeled electric vehicle according to EG vehicle class L2-U. Requirements for such vehicles are defined in the guideline 2002/24/EG and in the ordinance (EU) No. 168/2013 included in attachments of this ordinance and in delegate ordinances to this ordinance (EU) No. 168/2013.

BACKGROUND OF THE INVENTION

In structural terms, these requirements state among other things:
- a maximum speed of 45 km/h must not be exceeded;
- in the case of an electric drive, the electric motor or motors together is/are configured for a maximum nominal continuous electric power or useful power of up to 4 kW;
- there are requirements regarding the loading surface, wherein a vehicle for transporting goods has a (main) loading surface which can typically be configured as a flat bed;
- a width of such loading surface configured as a flat bed may not exceed the overall width of the vehicle without the loading surface;
- a minimum length of such a loading surface must be greater than/equal to ⅓ of the vehicle length;
- a maximum length of the loading surface must not exceed 1.4 times a larger vehicle track width of the front or rear track width of the class L vehicle; and
- the loading surface must not be more than 1000 mm above the road surface;
- additionally there are specifications which limit the maximum vehicle empty weight and the maximum payload; the empty weight of a three-wheeled moped of class L2e must not exceed 270 kg and the maximum payload must not exceed 300 kg.

The maximum rated continuous electric power of 4 kW is the "maximum 30-minute power" defined according to regulation ECE-R 85 (from 2006) which can be delivered by the electric drive system on average over a period of 30 minutes. For testing purposes, the power regulator, herein acceleration twist grip on the vehicle handlebar must be in the end position for 30 minutes while torque and RPM are being recorded simultaneously.

If the electric drive system could provide a higher electric useful power than this permissible maximum nominal continuous power of 4 kW, a regulator or controller must be provided to ensure that only the permissible maximum rated continuous power of up to 4 kW is provided. However, the electric drive system may briefly (for example within the scope of a "booster function") provide a higher electrical useful power, for example for accelerating the vehicle or when the vehicle has to overcome a gradient or an obstacle.

The vehicles require regulatory approval (type approval according to guideline 2002/24 EG). If an EU wide vehicle type approval is obtained in an EU state according to the guideline (EU) No. 168/2013, this approval, in conjunction with a "certificate of conformity", also authorizes the operation of a structurally identical vehicle in all other EU states.

Advantages for the users and operators of such L2e-U vehicles are:
- the driver only requires a driver's license of the class "S" (="moped driving license");
- the vehicle only has to be provided with "moped-license plate" so that low taxes and insurance cost are incurred; and
- the vehicle is not subject to the TUV inspections usual for passenger cars.

Typically, these are small, maneuverable vehicles which can be used advantageously for the transport of goods, including mail items, and other logistical services in an urban area and which require only a small amount of energy.

The document DE 202018 106 199 U1 describes, under the designation "three-wheeled moped car", a vehicle which is suitable for transporting goods and that can be equipped with an electric drive. "Moped cars" are understood here to mean small vehicles which are allowed to travel over the road at a maximum speed of 45 km/h. The moped car described in detail herein is equipped with three wheels and has a body which carries a driver's cab associated with the front wheel and a loading surface associated with the rear wheels; thus, the front wheel is arranged in front of the driver's cab in the direction of travel; and the front wheel and the rear wheels are each configured to be connectable to a drive assembly: here, in particular, an electric wheel hub motor can be associated with the front wheel as a drive assembly. As a special feature the driver's cab has a front part which extends beyond the front wheel, and the vehicle has a body which is formed in a frame structure and which carries a loading surface or a structural box. The front can form a curved hood which has a face like a truck and which is provided with a bumper. The structural box can be arranged behind the driver's cab in the direction of travel and can be integrated into the body and can consist entirely or partially of hollow tubes. The document does not limit the moped car described herein to the features of a vehicle intended for goods transport which meets the requirements of the EG vehicle class L2e-U.

The Document US 2009/0255747 A1 relates to a three-wheeled electric vehicle for transporting a standing person. The vehicle has a modular construction consisting of four sub-assemblies, namely a front fork on which a front wheel is mounted, a handle assembly, a main chassis formed of frame elements, and a rear wheel suspension assembly having two parallel trailing arms on each of which a motor driven rear wheel is mounted. These four subunits are connected by standard bolt connections. The main chassis carries a flatbed on which the person to be transported can stand and in this position can operate the steering arrangement. A tubular torsion bar stabilizer is clamped between the two longitudinal links. Each trailing arm is supported by a respective spring shock absorber on an upper support of the main chassis. The vehicle is equipped with a braking system which has mechanically acting brakes and/or electromagnetically and regeneratively acting brakes.

The document GB 2 394 701 A relates to a tiltable motor-driven tricycle for transporting a seated persona A water-cooled internal combustion engine serves as the drive motor. The three-wheeler has a chassis consisting of a front frame and a rear frame. Attached to the rear frame are the drive motor and the two motor-driven rear wheels, via which the three-wheeled vehicle assumes a stable arrangement on the roadway. Mounted on the front frame is a steerable fork with the front wheel and a driver's seat. As a special feature the front frame is connected to the rear frame via two pivot bearings.

The lower front pivot bearing is located at the front end of the rear frame, below the front frame. The upper rear pivot bearing is located on the rear frame above the driver's seat. The front frame with its components is arranged relative to the rear frame so as to be tiltable, pivotable or swivel able about a straight axis which extends from the point of contact of the front wheel on the road surface through the front swivel bearing to the rear swivel bearing. According to a side view representation of the three wheeler, this swivel axis can enclose an angle of 25 degrees with the direction of the road. Due to the center of gravity of the driver weight being below the pivot axis, the downward force generated by the weight of the driver will always force the driver's seat to the lowermost position, thus bringing the tricycle to an upright position. Steering the three-wheeler is carried similar to a conventional motorcycle by steering the front wheel and by lateral displacement of the weight of the rider, which causes the front wheel to incline with respect to the stably held rear wheels. This configuration is intended to allow higher cornering speeds than a conventional motorcycle. As evident from the drawings, both the front frame and the rear frame of the three-wheeled vehicle are constructed from frame elements.

The document DE 10 2017 116 733 A1 relates to a control device for at least one wheel hub motor on a vehicle. When the vehicle passes over uneven ground, then vibrating or oscillating superstructure movements can take place in the vehicle, which are caused by unevenness of the road surface or by dynamic driving effects. The torque introduction by the wheel hub motor not only causes an acceleration of the vehicle in or against the direction of travel, but because of the support of the wheel hub motor on the vehicle chassis, the vehicle is additionally accelerated in the vertical direction and/or subjected to other forces by such torque introduction. A corresponding control of the wheel hub motor generates a force in and/or against the vertical direction in order to dampen oscillations which occur, for example, by driving over an uneven ground. The control device is configured to control the wheel hub motor this way.

For this purpose, the control device can be configured as a digital data processing device, in particular as a computer, a microcontroller, a FPGA or the like. The control device has an input interface for accepting a state signal for describing a current superstructure movement of the vehicle. Furthermore, the control device has an output interface configured to put out the wheel hub signal. Furthermore, the control device includes a control module which is configured with a program-and/or circuitry to determine, in particular calculate, the wheel hub motor signal in response to the superstructure. Control device of this type or a comparable control device is referred to as "controller" within the scope of the instant application.

The document DE 10 201 007 249 A1 discloses, a three-wheeled load carrying bicycle having a chassis on which a front wheel and two rear wheels are mounted. The frame comprises vertical columns and at least one crossmember which together define a loading space into which a transport box for transporting material to be transported can be introduced. The transport box is configured for replaceable or exchangeable operation and is detachably fastened and held on the vertical columns and the crossmember by a receiving device. The receiving device has a receiving hook which is held displace ably along the vertical columns and includes a receiving opening into which a bolt attached to the transport box can enter. In a locking position of receiving hook and bolt, the weight of the transport box holds the bolt within the receiving opening. In addition, a clamping pin secures the locking position of the bolt in/on the receiving hook.

The document FR 2977229 A1 relates to a three-wheeler with a loading box. The three-wheeler has a frame on which a steerable front wheel and two drivable rear wheels are mounted. The rear wheels can be driven by a motor, for example by a common electric motor, or by a chain drive actuated by a driver's muscle power. The loading box is configured to be optimized for the transport of any goods and can also be configured for the transport of a patient. The loading box is configured to be mounted on the three-wheeled vehicle in an exchangeable manner. For this purpose, a releasable attachment is provided between the loading box and the three-wheeled vehicle frame. In various figures, the loading box forms a closed angular box with a flat rectangular bottom surface. A fastener is attached to each corner of the bottom surface. Each fastener includes a plate held by a spring clip and having a central bore therein. The three-wheeler frame forms a flat closed angular frame of longitudinal beams and transverse beams between the two rear wheels; the dimensions of the angular frame are aligned with the dimensions of the rectangular bottom surface on the loading box. In each corner of the angular frame a receiving element for each fastening element is attached. Each receiving element is designed as an open mouth into which the spring clip with plate on the fastening element can be inserted. The seat of the fastening element can be secured within the jaw-shaped receiving element by means of a blocking device which enters the opening within the resiliently held plate.

German Patent Application Serial Number 10 2019 003 129.6 filed on May 2, 2019 relates to a three-wheeled electric vehicle according to EG Vehicle Class L2e-U and specifies a rigid, self-supporting body configured in a frame construction, wherein frame elements of the body include metal round tubes and hollow rectangular profiles which are welded together;

a telescopic suspension fork pivotably mounted at a front end of the body;

a front wheel and a vehicle control arm with various operating elements including a brake handle and an acceleration twist handle mounted at the telescopic suspension fork;

two rear wheels driven by electric motors and each supported at the body by a wheel suspension;

a wheel hub motor fixed gearless at each rear wheel for electric for electric propulsion, wherein the wheel hub motor respectively includes an integrated motor control configured for a maximum nominal continuous power greater than 2 kW and less than 6 kW, in particular for a maximum nominal continuous power of approximately 4 kW;

each rear wheel of the two rear wheels respectively including a rear heel disc brake system which is actuated by a hydraulic medium pressure when the brake handle is pulled to perform a regular, hydraulically actuated braking operation of the rear wheels;

a controller including data storage capability and digital data processing capability mounted on the electric vehicle which ensures that the nominal continuous power supplied by both wheel hub motors in combination does not exceed 4 kW in normal operation;

wherein the body forms a support structure in a rear vehicle portion, wherein an optional exchangeable transport container is supportable and securable at the support structure by a quick release fastening system;

The patent application does not define how the quick release fastening system is configured.

A transport container which can be supported on a loading surface on the vehicle according to EG vehicle class L2e-U does not necessarily qualify as a component or part of the vehicle, but may be classified as part of the cargo. According to applicable regulations, the cargo does not count as part of the vehicle when it is not fixed at the vehicle. "Not fixed" means in this context that the load can be easily separated from the vehicle using a simple onboard tool or by means of a quick-release fastener. A transport container that can be separated from the vehicle by a quick-release fastener is therefore not considered a component of the vehicle.

BRIEF SUMMARY OF THE INVENTION

The object of the present invention is to provide a generic electric vehicle improving upon the above German patent application 10 2019 003 129.6 which includes a reliable quick-release system. In particular, it shall be possible to quickly and safely swap a transport container of a given type with a transport container of the same type-but with other contents and to securely hold it on the electric vehicle during normal driving operation.

Such an exchange of transport containers of the same configuration is advantageous in particular when a transport container filled with prepared, specific mail items is to be fastened to the electric vehicle quickly and reliably, and after completion of the job, is to be exchanged quickly and reliably with another prepared transport container of the same configuration, which is filled with new, different mail items to be distributed, in order to be able to rapidly execute a new job with this electric vehicle. The present invention provides a three wheeled moped for conveying goods designed for pure electric drive, which complies with the legal requirements of the European Parliament Regulation (EU) No. 168/13 dated Jan. 15, 2013 for vehicles of EG vehicle class L2e, here in particular subclass L2e-U.

Improving upon a three-wheeled electric vehicle having the features specified supra according German patent application No. 102019003 129.6, the solution according to the invention for the above object is characterized in that
   each rear wheel disc brake system includes an integrated electromechanical parking brake controlled by the controller wherein an actuation of the integrated electromechanical parking brake prevents a rotation of each rear wheel and sets a parking brake mode; and
   the quick release fastening system includes one or more connecting devices, wherein each connecting device
   includes a locking bar projecting outward from a base wall of the transport container; and
   includes a locking device permanently attached at the support structure and including an adjustable blocking member,
   wherein the locking device receives the locking bar of the transport container when the transport container is supported on the support structure and retains the locking bar through the adjustable blocking member that is in a locking bar retaining position where it retains the locking bar wherein the adjustable blocking member is movable from the locking bar retaining position into a locking bar release position distal from the locking bar where it releases the locking bar, and
   wherein the adjustable blocking member is only movable from the locking bar retaining position into the locking bar release position when each rear wheel is in park brake mode.

This blocking member adjustment can be carried out by an operator directly manually or indirectly with the aid of an adjusting member which can be adjusted by the operator and acts mechanically upon the blocking member. Alternatively, the blocking member adjustment can be initiated and effected by the controller, which for this purpose activates an electric motor provided on the locking device in order to adjust the blocking member. The subsequent text refers to a mechanical blocking member adjustment in the first embodiment and to an electrical blocking member adjustment in the second embodiment. A first embodiment of the present invention is provided with the mechanical blocking member adjustment, and a second embodiment of the present invention is provided with the electrical blocking member adjustment.

The coupling of the connecting device to the parking brake mode provides a simple and secure quick-fastening system. The quick-fastening system only has to be initiated by the vehicle user and is thereupon automatically executed and controlled by the controller based on data and programs stored in the controller.

The three-wheeled electric vehicle for goods transport according to the invention and described in the context of these documents, according to EG vehicle class L2e-U, is referred to below briefly as "the vehicle". Advantageous embodiments of the invention can be derived from the dependent claims, the subsequent description and the attached drawing figure.

A controller equipped with data storage capacity and digital data processing capacity is mounted on the vehicle. Typically, the controller is configured on a circuit board on which a microcontroller with microprocessor as well as peripheral devices and further customary components are located, here in particular the low-power supply for the microcontroller, analog-to-digital converter, as well as filters and protection devices which protect the microcontroller from dangerous signal strengths of supplied signals. The microcontroller may be a commercially available chip. The microcontroller stores software specifically developed for the vehicle, which processes various input signals and forms output signals by which various functions are controlled and executed, in particular also the motor control is performed by the microcontroller. The controller has a number of input interfaces, for example for receiving signals representing the current vehicle speed, brake signals, status signals for the status of the batteries, operating signals relating to actual operation of the two motors and further signals, such as vehicle lighting-ON, turn signal-ON and the like. These input signals are processed in the microcontroller in accordance with the specifications of the stored software in order to obtain (on) control signals for controlling the vehicle functions. The (on) control signals are put out via output interfaces at the controller, for example for generating the displays on a display device on the vehicle, for actuating the brake lights at the rear wall of the vehicle, for the motor controls of the two motors and the like.

The controller puts out motor control signals that ensure that:
   A nominal continuous power of 4 kW produced jointly by both motors is not exceeded during normal operations;
   initially, an actuation of an electric brake switch at the vehicle handle bar generates an electric brake signal, which is supplied to the controller, which in turn controls each motor into a recuperation operating mode so that a vehicle speed is initially reduced by motor braking;

after actuation of a parking brake switch the controller components of the electromechanical parking brake in a brake caliper of each rear wheel disc brake system put both rear wheels into a parking brake mode in which a rotation of the rear wheels is prevented; and both motors are controlled into a reverse drive mode when a reverse drive signal is present.

Communications between the controller and the motor control and further electrically controlled components and functions on the vehicle are performed via the usual CAN bus system (CAN=Controller Area Network).

Controlling the quick-release system according to the invention is also among the functions of the controller.

On the electric vehicle according to the invention, each rear wheel is provided with a rear wheel disc brake system which includes a hydraulically actuatable braking device and which is additionally provided with an electromechanical parking brake. Activating the electromechanical parking brake puts each rear wheel into a parking brake mode in which a rotation of the rear wheel is prevented.

A typical hydraulically actuatable disc brake system for performing a regular, hydraulically effected braking operation has a brake disc which is coupled in a rotationally fixed manner to the wheel to be braked and a brake caliper which acts on the brake disc and is fastened in a stationary manner to the wheel suspension, in/on which a brake cylinder/brake piston arrangement is provided. By actuating the brake pedal on the motor vehicle or the brake handle on the vehicle according to the invention, increased hydraulic medium pressure is generated in a hydraulic medium system, which is supplied via hydraulic medium lines to the brake cylinder/brake piston arrangement, acts on the brake piston therein and displaces the brake piston within the brake cylinder. This brake piston adjustment is transferred via brake actuators to the brake linings, which are thus pressed against the brake disc and initiate a regular hydraulically effected braking operation on the wheel.

On the electric vehicle according to the invention, each rear wheel is equipped with a rear wheel disc brake system which includes a hydraulically actuatable braking device and which is additionally provided with an "electromechanical parking brake". The term "electromechanical parking brake" stipulates braking devices which are referred to in the technical field and by various manufacturers inter glia as "brake caliper integrated" electromechanical parking brake, or as electromechanical parking brake or as electric parking brake (EPB). The operation of such an electromechanical parking brake puts each rear wheel in a parking brake mode in which a rotation of the rear wheel is prevented.

An electromechanical parking brake of this generic type includes an electric parking brake motor that drives a multi-stage transmission with a high step down gearing ratio through a cog belt wherein the transmission drives a spindle including an external thread that causes a feed nut that is coupled with the brake cylinder to rotate. Depending on a direction of rotation of the spindle the feed nut at the spindle thread is moved forward or backward. A forward movement puts the feed nut in contact with the brake piston and adjusts the brake piston within the brake cylinder. Due to the high stepdown transmission ratio i.e. 50 to 1, a high force is applied to the brake pads over a short distance which stops the wheel reliably and permanently. The rear wheel coupled with the electromechanical parking brake is put into a parking brake mode where a rotation of the rear wheel is prevented. Each electromechanical parking brake includes a parking brake control unit integrated in the brake caliper that is controlled and checked by the controller. During an activation of the parking brake the parking brake motors pull electrical current which is registered by the parking brake control unit and reported to the controller. Consequently, the controller knows the parking brake mode condition of each rear wheel. The spindle mechanism is self-locking so that a parking brake mode entered by the activated parking brake is locked an remains effective even when electrical current to the vehicle is interrupted. When there is an emergency brake situation the parking brake can be activated in addition to the normal braking process that is initiated by pulling the brake handle at the vehicle handle bar. Since this parking brake process functions rather abruptly the controller checks a current vehicle speed and initiates the parking brake mode for a moving vehicle only when the vehicle speed is less than 2 km/h per hour.

Electromechanical locking brakes or electro mechanical parking brakes (EPB) are known and described e.g. in the document WO 2011/029 812A1. The hydraulically actuatable rear wheel disc brake system with integrated electromechanical parking brake provided at the vehicle according to the invention for the rear wheels can be purchased e.g. from Continental Automotive GmbH, 20165 Hanover, Germany under the product designation EBP-Cl Electric Parking Brake—(caliper integrated), herein Continental part number 11.6236-0089.4 for a left wheel brake system and Continental part number 11.6236-0090.4 for a right wheel brake system.

As stated supra the connection devices retaining an exchangeable transport container at the vehicle will only release the retained transport container when both rear wheels are in a parking brake mode.

The vehicle, advantageously the vehicle handle bar includes an electromechanical parking brake switch adjacent to the brake handle wherein the parking brake switch is actuated by an operator to initiate the parking brake mode or to deactivate an existing parking brake mode. The actuated parking brake switch generates a corresponding parking brake signal that is fed to the controller which subsequently after checking other conditions controls the parking brake motor in each rear wheel disc brake system so that the parking brake mode is activated or deactivated.

According to an advantageous embodiment of the invention the three wheeled electric vehicle is characterized in that a locking rod is slidably supported and guided on and along the support structure and includes a front end portion that forms the blocking member and a rear end portion distal therefrom forming a handle, typically arranged in an area of a rear wall of the vehicle where it can be gripped by an operator who mechanically hand adjusts the locking rod so that the blocking member moves into the locking bars retaining position or the locking bars release position; and the locking bar includes a straight elongated square portion in which a bore is recessed orthogonal to a longitudinal direction of the locking bar, wherein the blocking member enters into the bore when the blocking member is in the locking bar retaining position.

Typically the support structure includes a paired arrangement of an upper outer longitudinal beam and an upper inner longitudinal support each extending in a vehicle longitudinal direction above each rear wheel. As an additional feature of the first embodiment described supra two offset mounting plates which project vertically and is directed towards the upper outer longitudinal beam are welded to the upper inner longitudinal beams, each mounting plate having a bore hole that is penetrated by the locking rod.

The mounting plates support and guide the locking rod at the support structure. The blocking member can be arranged in the locking bar retaining position and in the locking bar release position reliably. Stops can be arranged at the vehicle rear wall so that the locking rod handle can be applied to the stops and secured in this position.

According to an advantageous embodiment of the first embodiment of the invention
- the locking device includes a locking bar position sensor that detects a presence or non-presence of the locking bar at/in the locking device and generates a locking bar non-presence signal when the locking bar is not present or generates a locking bar presence signal when the locking bar is present and transmits the respectively generated locking bar presence signal or locking non-presence signal to the controller;
- the locking device includes a blocking member position sensor which generates a blocking member presence signal when the blocking member is in the locking bar retaining position and transmits the blocking member presence signal to the controller; and
- the controller only deactivates an activated parking brake mode upon an actuation of the parking brake switch
- when a locking bar non-presence signal is simultaneously provided to the controller; or
- when a locking bar presence signal and a blocking member presence signal is simultaneously provided to the controller.

This embodiment simply and reliably provides a coupling of the locking of a transport container optionally provided at the vehicle with the parking brake mode of the rear wheels at the vehicle.

Advantageously these sensors can be arranged at the inner mounting plate that is remote from the vehicle rear wall, at the support structure or at the inner mounting plate.

A quick release fastening system can be provided that includes a manually actuatable locking device. The separation of the transport container from the vehicle that is initiated by an operator is in any case performed when the vehicle is at a standstill because the controller then performs an activation of the parking brake mode self-acting and automatically when the operator has neglected or omitted to initiate the parking brake mode by actuating the parking brake switch before removing the transport container from the vehicle.

When a locking bar non presence signal is provided to the controller the controller will not activate a parking brake mode and an otherwise activated parking brake mode can be deactivated by the regular means so that the vehicle can be moved self-propelled when no transport container is mounted at the vehicle.

The second embodiment of the invention will be described infra and includes an electrically caused locking member adjustment.

Improving upon a three wheeled electrical vehicle with the features recited supra and described in the German patent application DE 10 2019 003 129.6. Another advantageous embodiment of the invention is characterized in that
- each rear wheel disc brake system includes an integrated electromechanical parking brake controlled by the controller wherein an actuation of the integrated electromechanical parking brake prevents a rotation of each rear wheel and sets a parking brake mode; and
- the quick-release fastening system includes one or more connecting devices, wherein each connecting device
- includes a locking bar projecting outward from a base wall of the transport container; and
- includes a locking device permanently attached at the support structure and including an adjustable blocking member,
- wherein the locking device receives the locking bar of the transport container when the transport container is supported on the support structure, and
- wherein the locking device includes a first electric motor or an alternative electric motor controlled by the controller and a blocking member adjustable by the first electric motor or the alternative electric motor, wherein the blocking member is movable into a locking bar retaining position where the blocking member retains the locking bar or into to a locking bar release position distal from the locking bar where the blocking member releases the locking bar, and
- wherein the controller ensures that the respective electric motor is only able to move the blocking member from the locking bar-retaining position into the locking bar-release position when each rear wheel is in the parking brake mode.

The second embodiment does not require direct manipulation by an operator and plural connection devices can be provided at comparatively difficult to access locations at the vehicle.

The vehicle e.g., the handle bar of the vehicle, in particular adjacent to a pivotable brake handle includes an electromechanical parking brake switch that is adjustable by an operator into a parking brake mode on position or a parking brake mode off position. This switch position change is fed to the controller as a parking brake signal wherein the controller subsequently activates a parking brake motor through a parking brake control unit at or in a brake caliper of each rear wheel disc brake system in order to put both rear wheels at the vehicle according to the invention the parking brake mode. An activated parking brake mode prevents a rotation of any rear wheel. The vehicle sits stationary. The transport container can be lifted, separated from the vehicle and replaced with another transport container when the vehicle is stationary without risk by using an external lifting device, thus a manually operated fork lift.

The parking brake mode of the wheels is activated in the parking brake switch on position and the parking brake mode is not activated in the parking brake switch off position or a previously activated parking brake is deactivated. Since only the operator can perform this change of the current parking brake switch position it is assured that the operator must be present and active when the deactivating a previously activated parking brake mode at the vehicle. The vehicle cannot roll off unattended because a previously activated parking brake mode has been deactivated unintentionally e.g. due to a malfunction of the controller.

According to another advantageous embodiment of the vehicle, e.g. the vehicle handle bar and thus in particular the vehicle handle bar adjacent to the accelerator twist grip includes and electromechanical locking switch that is adjustable by an operator into a lock on position or a lock off position. This switch position change is fed to the controller as a locking condition change signal so that the controller subsequently controls the locking device electric motor so that the n moves the blocking member from the locking bars release position into the locking bars retaining position in the lock on position or alternatively and accordingly the blocking member is moved from the locking bar retaining position into the locking bar release position in the lock off position.

Thus, it is essential and important that the submodule in the controller that controls the blocking member adjustment only uses an incoming lock off signal and transposes it into an activation of the locking device electric motor when a parking brake mode on signal is already supplied to the controller and the parking brake mode is actually activated. When the parking brake mode is deactivated the lock off signal triggered by the operator by activating the locking switch remains ineffective. The operator initially has to move the parking brake switch into the parking brake mode on position and then move the locking switch into the lock off position again in order to achieve an adjustment of the blocking member from the locking bar retaining position into the locking bar release position. In this locking bar release position the transport container can be disengaged from the support structure and removed from the vehicle.

This joint and coupled effect of parking brake switch and locking switch assures that the transport container can only be removed from the vehicle when both rear wheels of the vehicle are in the parking brake mode and therefore cannot rotate, thus the vehicle is at a standstill.

The electric vehicle according to the invention has a body that provides room in a rear vehicle portion above the support structure for a virtual flat loading surface. This loading surface extends in parallel and at a distance of approximately 35 to 40 cm above a vehicle axis plane defined by the three vehicle axes and by a rear vehicle end, the two vehicle side faces and by a roll bar behind the driver seat. In a regular embodiment of the electric vehicle according to the invention the loading surface along the vehicle longitudinal axis has a length of approximately 75 cm and a width of approximately 120 cm orthogonal thereto. In a long version of the electric vehicle according to the invention the loading surface has a length of 100 cm, with a width that is the same as in the previous embodiment.

"Approximately" designates a range of −3% to +3% about the provided number for this and similar sections of the application. Consequently a width of 120 cm in the instant embodiment can actually have values between 116.4 cm to 123.6 cm.

Below this virtual loading surface and above each rear wheel there is the support structure where a transport container can be supported and retained. According to another advantageous embodiment this support structure includes a paired parallel and off set arrangement of an upper, outer longitudinal beam and an upper inner longitudinal beam respectively extending in the vehicle longitudinal direction above each rear wheel, wherein the vertically protruding mounting plate is arranged and welded at the upper inner longitudinal beam that is oriented towards the upper outer longitudinal beam wherein the locking device is fixed at the mounting plate.

Typically each longitudinal beam forms a section of a tubular metal frame element of the vehicle body.

Each rear wheel assembly of the electric vehicle that includes a wheel hub motor, rear wheel attached thereon and a rear wheel disc brake assembly coupled thereto has only a rather small width of approximately ⅓ of the vehicle width due to the design of the electric vehicle. Between the 2 rear wheel assemblies that are arranged offset to one another there is a free space that is used for transportation purposes. A permanently provided auxiliary container can be inserted into this free space wherein the auxiliary container is fixed at the vehicle body.

Alternatively, the auxiliary container can penetrate into this free space wherein the auxiliary container is applied at a base of the primary transport container that is supportable on the loading surface and wherein the auxiliary transport container forms a common interior transport volume together with the primary transport container. The primary transport container typically forms a cuboid box which is arranged in a vehicle width direction with a box longitudinal direction at the vehicle. The cuboid but smaller auxiliary container is applied to the transport container base wall centrally and with an auxiliary container longitudinal direction perpendicular to the transport container longitudinal direction so that a common transport container including the primary transport container and the auxiliary transport container is obtained. This common transport container has an essentially T-shaped cross section in a direction wherein the primary transport container forms the T-bar and the additional transport container forms the T-trunk. Adjacent to both auxiliary container side faces the common transport container includes a respective base wall section wherein the at least one locking bars of the connection device according to the invention vertically protrude from the base wall section. Subsequently the base wall of the actual transport container and the 2 base wall sections of the common transport container are designated as base wall.

According to an advantageous embodiment of the invention, two mounting plates offset from one another in the vehicle longitudinal direction are welded to the 2 upper inner longitudinal beams of the support structure described supra and a respectively locking device is fixed at each mounting plate so that a total of 4 connection devices are arranged at the electric vehicle according to the invention. Correspondingly 4 locking bars protrude from the base wall of the actual or common transport container. These locking bars typically have a length of approximately 4-8 cm. These locking bars can be provided in various embodiments.

According to an advantageous embodiment of the invention, the locking bar includes a straight elongated square piece that is typically made from stainless steel and that includes a bore orthogonal to its longitudinal direction wherein the blocking member enters into the bore when the blocking member assumes the locking bars retaining position.

Advantageously the square piece can form an arm, of a 90 degree angle piece that has another arm that is oriented parallel to the transport container base wall and attached to the transport container base wall.

These locking bars facilitate attaching the replace able transport container that is arranged on the loading surface in a simple, stable manner at the support structure so that it is also disengageable in a controlled manner.

According to an advantageous embodiment the locking bar forms a straight elongated cylindrical pin,
  integrally formed on a mounting plate and attachable to a bottom side of a transport container base wall;
  including a pin enveloping surface in which a circumferential pin groove is recessed; and
  the locking device includes a lock body,
  including a receiving bore into which the locking bar is able to enter;
  the lock body also includes a blocking bore which partially intersects the receiving bore and into which the locking member is able to enter and is displaceably guided therein; and
  in the locking bar retaining position,
  the locking bar is inserted into the receiving bore;

the blocking member is inserted into the blocking bore; and a blocking member section occupies a common volume section in the receiving bore, in the pin groove and in the blocking bore and thus retains the locking bar in the lock body by positive form locking.

As stated supra, a mounting plate is welded advantageously at the upper inner longitudinal beam of the support structure and protrudes vertically towards the upper outer longitudinal beam. According to another advantageous embodiment of the instant invention, the lock body is fixed at the mounting plate so that the receiving bore hole of the lock body is oriented vertically, thus orthogonal to the loading surface plane.

The locking device is attached at the vehicle body in a stable, durable and space saving manner. The lock body provides a support for the locking bar. Even comparatively small dimensions of locking bars and lock body provide a stable and secure connection between the transport container supported on the support structure and the vehicle body.

It is advantageously provided according to another embodiment of the invention that a first electric motor that is part of the locking device drives spindle which adjusts a feed nut that is coupled torque proof with the blocking member which is in turn retained and supported torque proof relative to the lock body.

Thus, a spindle portion is provided with an external thread, that engages a feed nut which is coupled torque proof with the blocking member. Depending on a direction of rotation for the spindle, the blocking member coupled therewith is moved towards the lock body or away from the lock body. A movement towards the lock body adjusts the blocking member into the locking bars retaining position and a movement oriented away from the lock body adjusts the blocking member from the locking bars retaining position into the locking bars release position. The electric motor can be advantageously configured as a stepper motor which performs the number of spindle rotations required for the adjustment travel of the blocking member as specified by the controller.

According to an alternative embodiment it is provided for a blocking member adjustment that an alternative electric motor that is part of the blocking device pivots a lever that is pivotable connected through a connection piece with the blocking member.

In this case it has proven advantageous for the alternative electric motor that is part of the blocking device to have a cuboid housing that is arranged in a corresponding rectangular cut out which is recessed in an arm of an angle piece that has another arm that contacts a side surface of the lock body that is arranged opposite to the mounting plate and that is attached thereto.

The lock body is fixed by the mounting plate at the upper inner longitudinal beam of the support structure. The electric motor support is fixed at the lock body and the alternative electric motor that is fixed in the electric motor support is arranged at a predetermined constant distance from the lock body and the receiving bore hole within the lock body. The blocking member moves in a direction parallel to the direction of the transport container base wall and perpendicular to the pin direction. Due to these features the blocking member adjusted by the alternative electric motor, can reliably move into a position in the lock body where it partially blocks the receiving bore hole and where it reliably retains the pin shaped locking bars arranged in the receiving bore hole by positive form locking in a defined manner.

According to another advantageous embodiment, the locking device is provided with a locking bars position sensor which detects presence or non-presence of the locking bars in the locking bars retaining position within the receiving bore hole of the lock body and transmits a corresponding locking bars position signal the controller.

Advantageously a corresponding locking bar position signal is detected for all four locking bars that protrude from the transport container base wall and transmitted to the controller so that the controller can determine unambiguously whether a transport container is arranged at the vehicle or not. When no transport container is arranged at the vehicle the parking brake mode can also be deactivated and the vehicle can be put in motion when no blocking member is in the locking bars retaining position. However when the locking bars position sensors have confirmed the presence of the transport container at the vehicle, an existing parking brake mode can only be deactivated and the vehicle can only be put in motion when each blocking member is in its locking bars retaining position. This can be checked and reported by a respective blocking member position sensor.

According to another advantageous embodiment, the locking device is additional provided with a blocking member position sensor which detects a presence or non-presence of the blocking member in the locking bars retaining position and transmits a corresponding blocking member position signal to the controller.

The presence of all blocking members in the respective locking bars retaining position, and thus presence of the transport container and its correct attachment at the vehicle, can be actually checked and confirmed in real time. This provides more safety than simply resorting to data provided in the controller for transmitting commands to the locking device electric motor. Advantageously a positive blocking member position signal can be displayed on a display provided at the vehicle.

Each of the three vehicle wheels is provided with a proper hydraulically actuated disc brake system. A container filled with hydraulic fluid is arranged at the vehicle handle bar wherein a piston/cylinder arrangement is connected by hydraulic fluid conduits with the different disc brake systems. The front wheel is configured with a disc brake system that is only actuate able hydraulically. Both rear wheels respectively include a rear wheel disc brake system which is additionally configured with the electromechanical parking brake described supra.

The rear wheels are operated according to a three stage brake routine. Pulling the brake handle attached at the vehicle handle bar initially adjusts a push rod that is pivot ably attached at the hand grip and that impacts an electromechanical brake switch which subsequently generates an electric brake signal that is fed to the controller which subsequently causes the motor controls of the two wheel hub motors to control each motor into a recuperation mode. The vehicle speed is reduced by engine braking.

When pulling the brake handle further the push rod presses onto the piston of the piston/cylinder arrangement which increases hydraulic pressure in the cylinder the increased hydraulic medium pressure is fed by hydraulic medium conduits to the brake cylinder and the brake piston loaded therewith and adjusted thereby pressed the brake pads against the brake disc. Additional braking force and braking effect is obtained by actuating the disc brakes provided at all 3 vehicle wheels. Last not least the controller after corresponding actuation of the parking brake switch by the operator and checking the current vehicle speed can activate the electromechanical parking brakes at a vehicle speed of less or equal to km per hours to put both rear wheels into a parking mode where a rotation of the rear wheels is prevented.

German patent application DE 10 2019 129.6 is incorporated by reference in its entirety and describes additional components, details and features of the electric vehicle according to the invention.

BRIEF DESCRIPTION OF THE DRAWINGS

The vehicle according to the invention is subsequently described based on advantageous embodiments with reference to drawing figures, wherein

FIG. 5A illustrates a transport container:

FIG. 5B illustrates an auxiliary container;

FIG. 6A illustrates components of a locking device;

FIG. 6B illustrates an alternative locking bar;

DETAILED DESCRIPTION OF THE INVENTION

The subsequent description of the vehicle and its components uses location and directional information. The vehicle is presumed to be standing or driving on a flat horizontal surface. Then the axles of the three vehicle wheels define a plane that is parallel to the surface. This plane is used to establish a cartesian coordinate system with X-direction runs in this plane in driving direction; the vehicle longitudinal direction runs in the X-direction. Accordingly the Y-direction is oriented in this plane transversal or perpendicular to the driving direction and designates a side or lateral direction. The Z-direction extends perpendicular to this plane and designates an elevation direction. Consequently below or lower in the Z-direction means closer or adjacent to the ground. Up or upper means in Z-direction further away or remote from the ground. Front or forward is oriented in the Z-direction towards the front of the vehicle, rearward is oriented in the X-direction toward the rear of the vehicle.

Figure 1A:
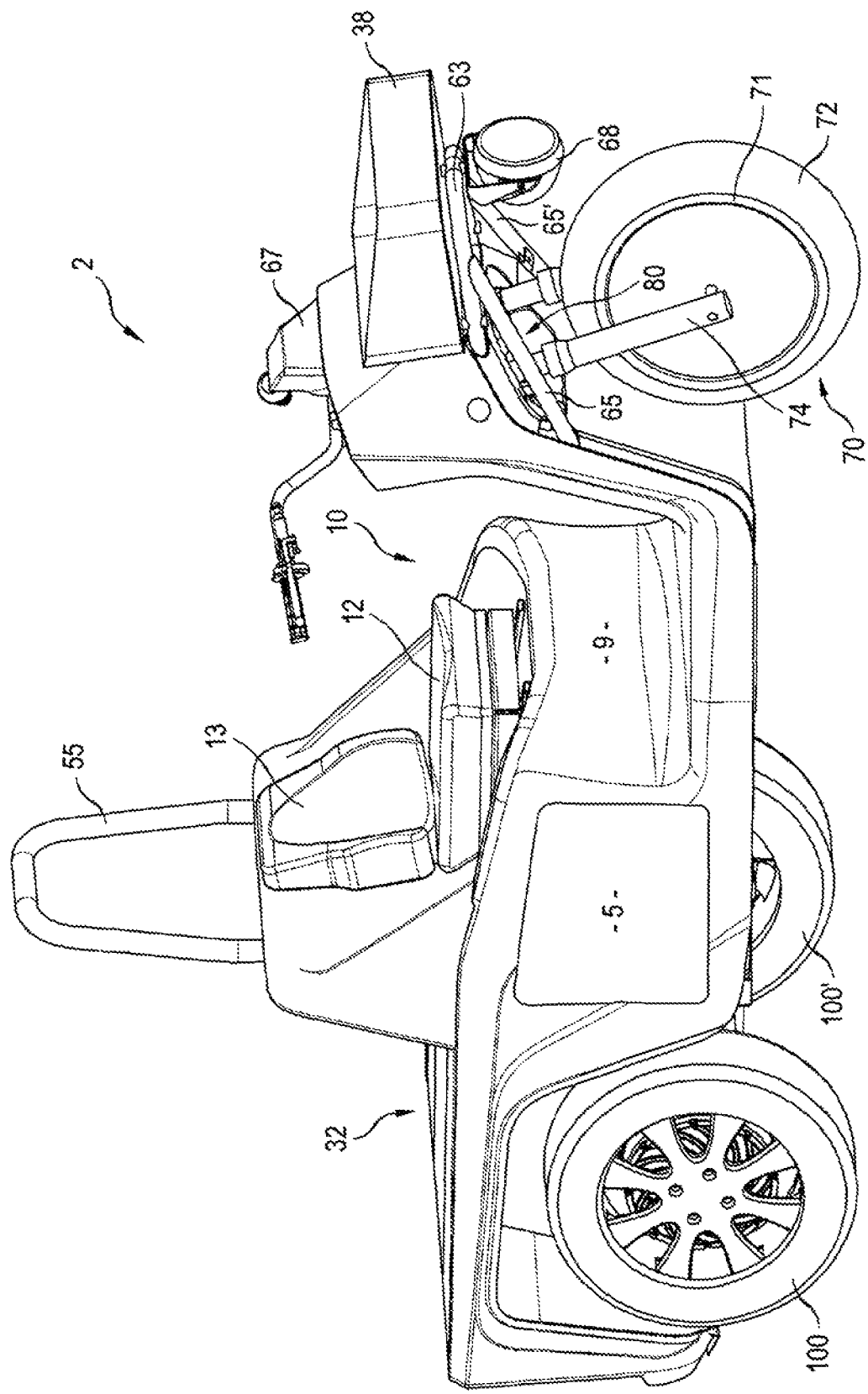
FIG. 1A illustrates a perspective front view of a front and side of the vehicle according to the invention.
Figure 1B:
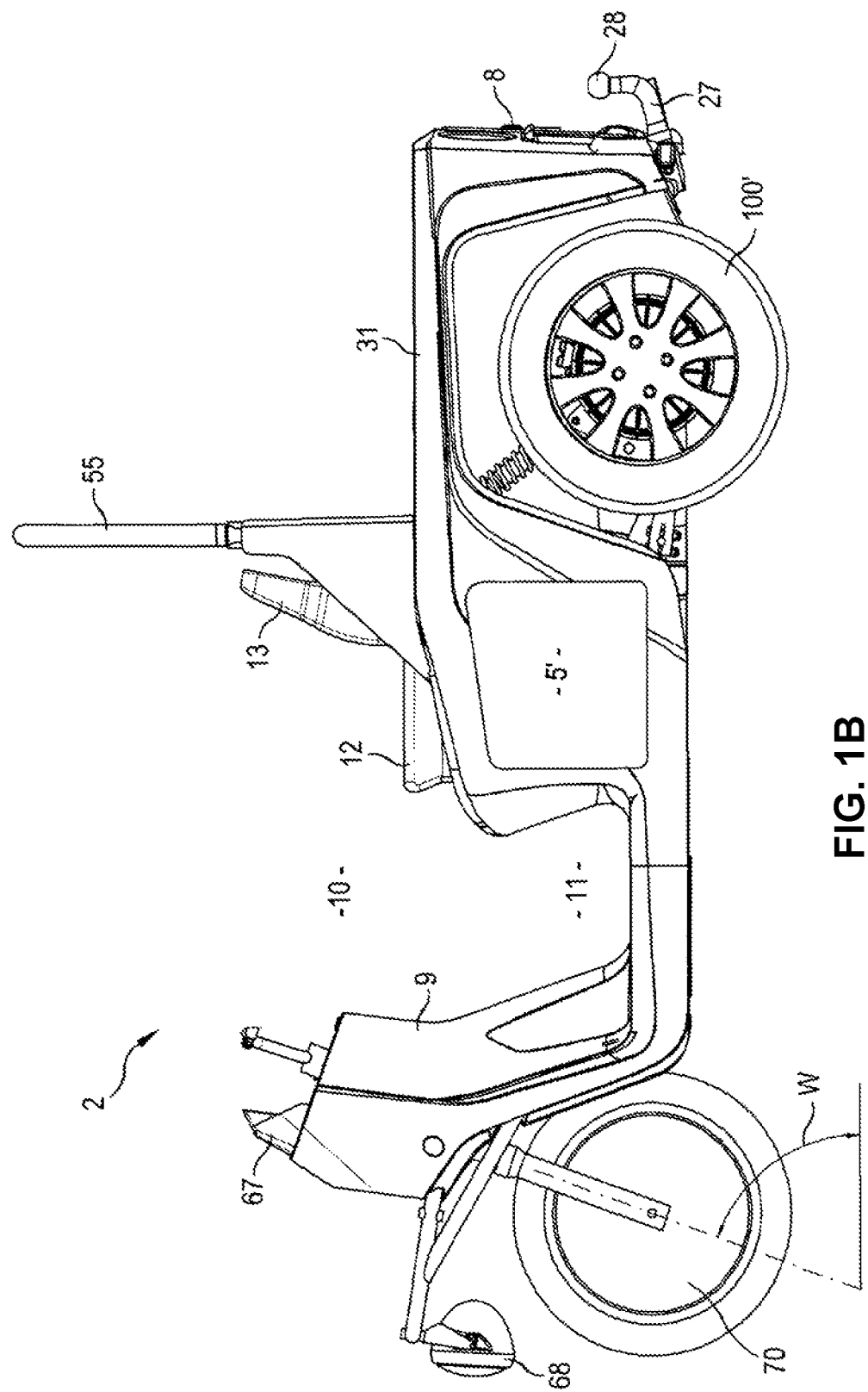
FIG. 1B illustrates a side view of the vehicle.
Figure 1C:
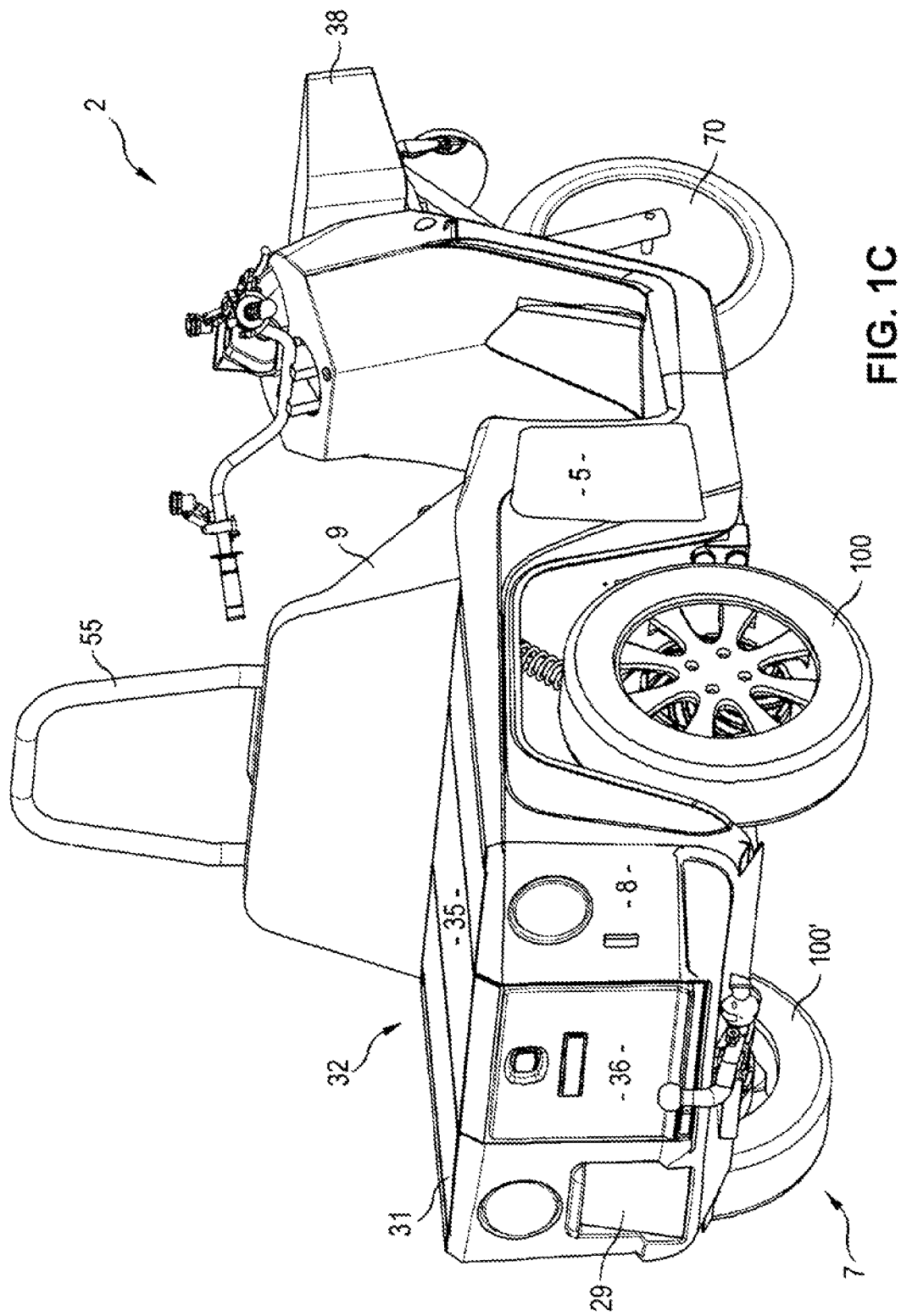
FIG. 1C illustrates a perspective rear and side view of the vehicle.
Figure 2A:
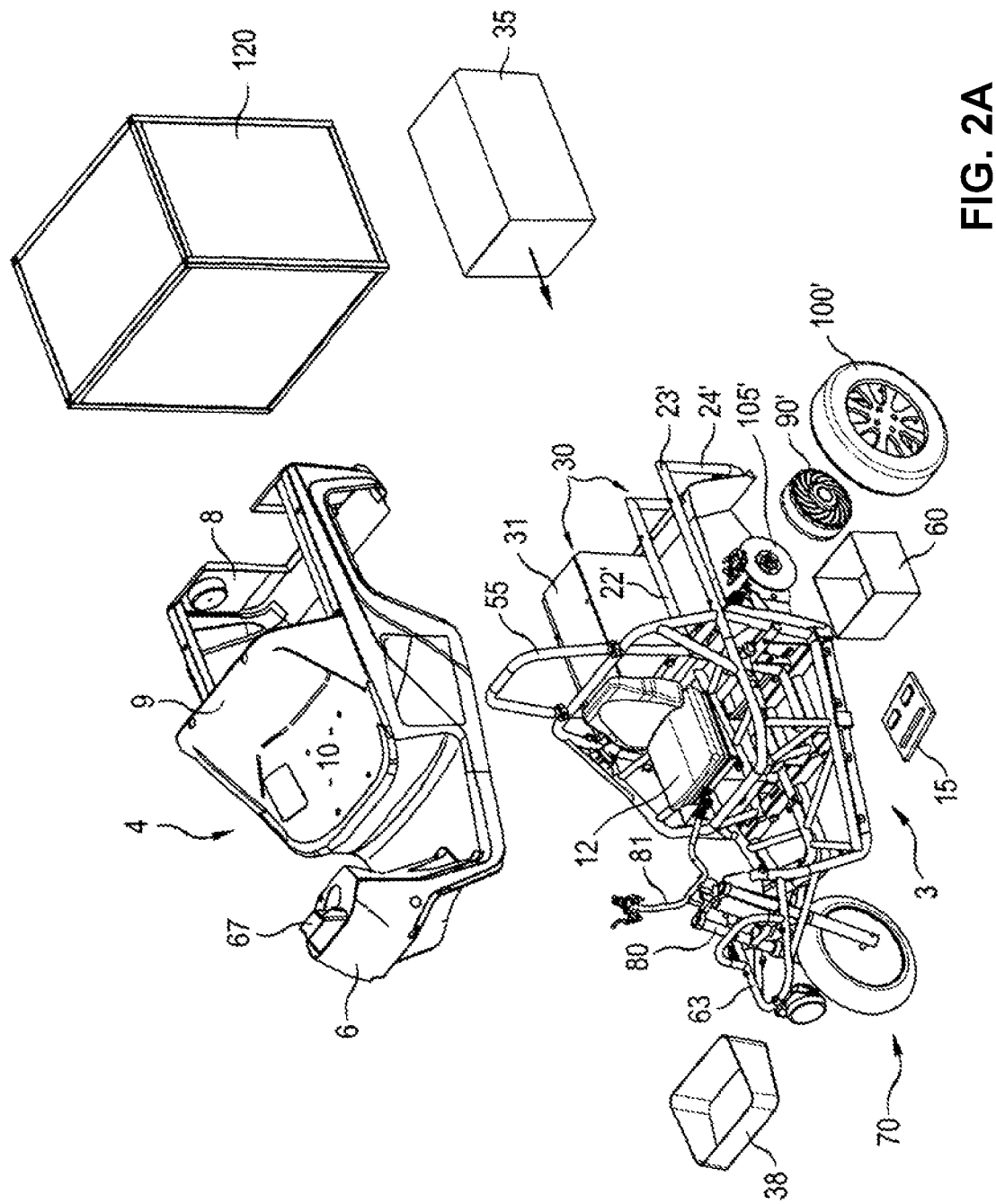
FIG. 2A schematically illustrates various components of the vehicle.

FIGS. 1A, 1B and 1C show the vehicle 2 according to the invention wherein the central components are indicated in FIG. 2A, The vehicle 2 is a three wheeled vehicle with a steerable front wheel 70 and two electrically driven rear wheels 100, 100'. The vehicle 2 includes a body 3 where a vehicle faring 4 is suspended. The vehicle structure also includes a chassis with wheel suspensions for the two rear wheels 100, 100'. last not least the vehicle structure includes a telescopic suspension fork 80 pivot ably arranged at the body 3 and including a handle bar 81 configured to steer the front wheel 70.

The body 3 includes a driver seat 12 for a driver. The electric motors of the vehicle are supplied with electrical energy from a battery 60 that is arranged in a compartment 59 below the driver seat 12.

The vehicle 2 includes a circuit board including a micro controller with micro-processor and known components providing data storage capability and digital data processing capability. The entire arrangement is subsequently designated as controller 15. The controller 15 can be arranged in a compartment below the batteries 60.

Figure 3A:
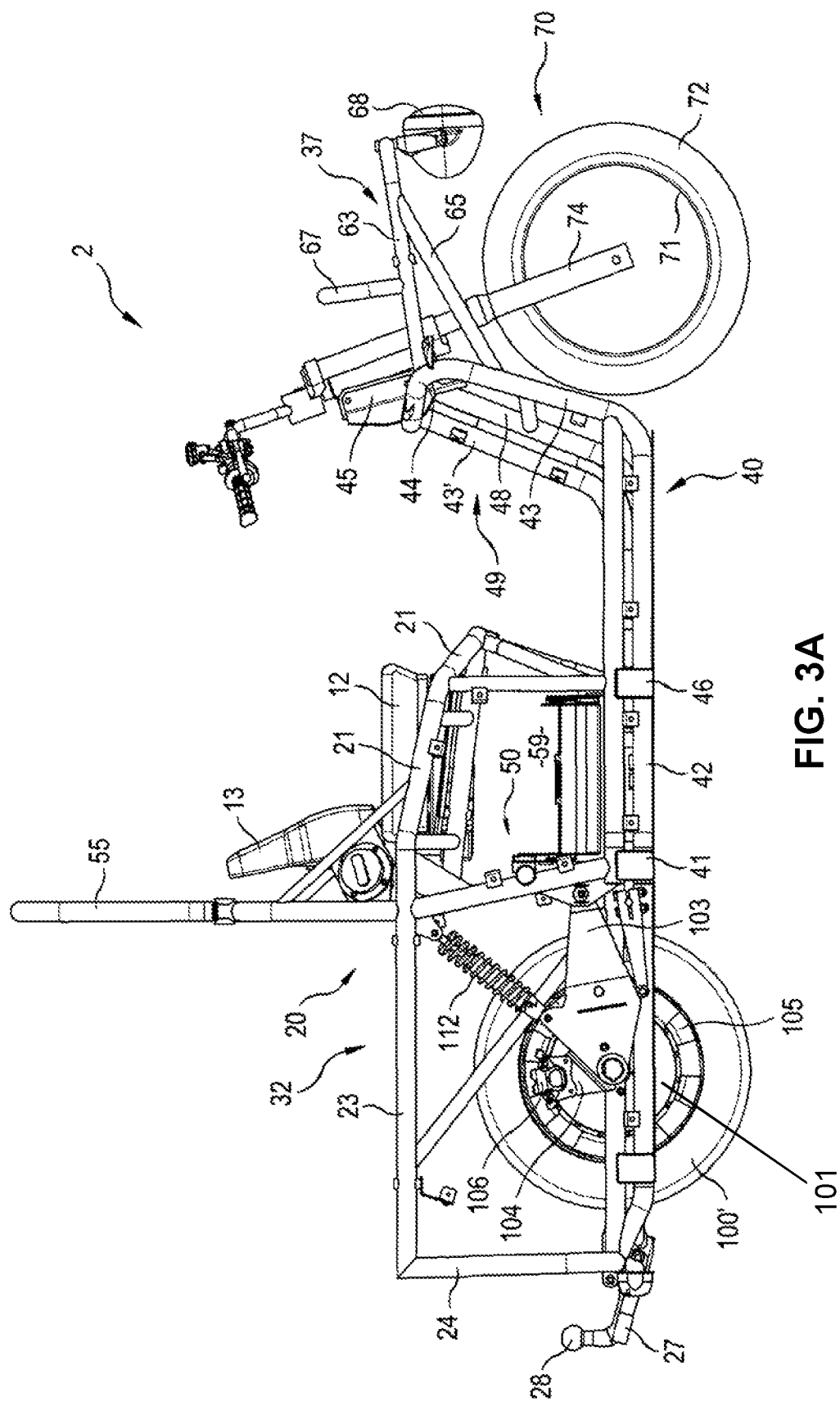
FIG. 3A illustrates a side view of the vehicle without faring.

The body 3 is of the vehicle 2 is subsequently described in detail with reference to FIGS. 3A and 3B and 3C. The body 3 is configured in frame construction including a frame made from essential elements made from metal that are typical in vehicle construction. Typical materials are iron and steel and light metal alloys based on aluminum or magnesium. Among the essential elements are tubes, rods and profiles that are connected with one another directly or via nodes. When connected directly the elements are typically welded together. Tubes made from iron or steel typically have a diameter of 40 mm and a wall thickness of 2 mm. tubes made from an aluminum material typically have a diameter of 40 mm and a wall thickness of 6 mm. the body 3 has three essential components, namely an upper carrier element 20, a lower carrier element 40 and a vertical support frame 50.

The upper carrier element 20 forms a closed frame made from tubes and tube sections including an upper transversal beam 21 arranged in front of the vehicle center horizontally extending in the transversal direction formed from straight tube sections and overall U-shaped wherein ends of the upper transversal beam are respectively connected with a horizontally backward extending upper outer longitudinal beam 22, 22', at whose rear ends a respectively vertically descending tube 24, 24' is connected whose ends are connected with one another by a lower horizontally oriented transversal beam 25. The lower transversal beam 25 designates a lower edge of a vertical vehicle rear wall 8. A protruding neck 27 of a ball head coupling 28 can be attached at this lower transversal beam 25.

The two ends of a forward upper transversal beam 26 are welded to both upper outer longitudinal beams 22, and 22' wherein upper inner longitudinal beams 23, and 23' are welded to the forward upper transversal beam 26. Upper outer longitudinal beams 22, and 22' and upper inner longitudinal beams 23 and 23' jointly form a basis for a flat horizontally oriented virtual rear loading surface 32 that is arranged above the rear wheels and that extends over an entire vehicle width. On the other hand side, the two arrangements respectively made from upper outer and inner longitudinal beams 23 and 22 and upper outer and inner longitudinal beams 23' and 22' form a support structure 30 where a subsequently described replace able transport container 120 or 130 can be temporarily supported and retained. Typically each of these assemblies and the rear wheel 100 or 100' is enclosed by a cover 31. FIG. 3B shows two locking devices 140 not drawn to scale at each upper inner longitudinal beam 23, 23' wherein the locking devices are configured to retain the replace able transport container 120 or 130 at the vehicle temporarily.

The vehicle 2 according to the invention typically has a width of 120 cm and a length of the virtual loading surface 32 can be approximately 74 cm so that a virtual rear loading surface 32 reaches a rectangular surface area of approximately 8880 cm/sq. a long version of the vehicle according to the invention has a total vehicle length of 275 cm and a length of the rear loading surface 32 of approximately 102 cm. This complies with the legal regulations for a L2e-U vehicle that has to have a minimum length of the main loading surface greater than or equal to the vehicle length.

Typically this virtual loading surface 32 is at a distance of approximately 75 cm above the driving surface.

The lower support element 40 forms a closed frame together with a lower rear transversal beam 41 that runs behind the vehicle center and in front of the two rear wheels 100 and 100' horizontally in the transversal direction over the entire vehicle width wherein ends of the lower rear transversal beam 41 are respectively connected with a lower horizontal outer double tube longitudinal beam 42 and 42' both of which run towards each other in a forward direction. The body front 6 has a reduced width of approximately half of the vehicle width. At this location the two outer lower longitudinal beams 42 and 42' respectively form an ascending one tube pillar 43 and 43' of a backward cambered bridge 44. A forward extending solid block 45 is attached at the camber of the bridge. Additionally the lower support element 40 includes a lower center transversal beam 46 arranged approximately in a vehicle center and extending in the transversal direction wherein ends of the lower center transversal beam 46 are respectively welded together with a tube of the lower outer longitudinal beams 42 and 42'. The lower rear transversal beam 41 and the lower center transversal beam 46 are respectively configured as a hollow rectangular profile. A center of the center transversal beam 46 is connected with another lower center longitudinal beam 47 extending horizontally forward in the vehicle longitudinal direction wherein the lower center longitudinal beam 47 includes a rising forward end section 48 that, also terminates at the block 45 and is welded thereto. The two rising bridge pillars 43, and 43' and a forward end section 48 of the center lower longitudinal beam 47, centrally extending there between in the same direction jointly form a forward protecting barrier 49 for a foot space 11 of a driver of the vehicle 2.

A telescopic suspension fork 80 is pivotably attached at the block 45 and rotatably supports a non-motor driven front wheel 70. As evident from FIG. 3B, the telescopic suspension fork 80 has two parallel upper fork tubes that are held together by a lower fork bridge 75 and an upper fork bridge 76. A fork tree is centrally inserted between the two bridges 45 and 76 wherein the fork tree is pivotably supported in a fork tree tube which is in turn welded to a front edge of the massive block 55. This combination of fork tree, and fork tree tube pivotably supports the telescopic suspension fork 80 at the vehicle body 3. A handle bar 81 is attached torque proof at the upper fork bridge 76. The entire telescopic suspension fork 80 is slanted forward and an orientation of the fork tree defines a direction of a steering axis that forms the steering head angle W relative to horizontal as indicated in FIG. 1B. According to the invention a steering head angle of 68 degrees to 72 degrees, in particular a steering head angle of W of 70 degrees is provided. This steering head angle provides agile and well controllable steering under substantial loads on the front wheel 70. Typically the front wheel 70 has a 15" rim 71 that supports a tire 72 advantageously a typical motor cycle tire of the size 120/70 are R15. The front wheel 70 is provided with a hydraulically actuatable disc brake system that includes a brake caliper with two brake pads that is attached at a lower sliding tube 74 of the telescopic suspension fork 80.

A forward loading surface 87 is provided on a U-shaped support 63 in front of the telescopic suspension fork 80 wherein the support 63 is supported by supports 65, 65' at the rising single tube pillars 43 or 43' of the lower carrier element 40. A cargo basket, or another cargo carrier can be provided on this forward loading surface 87 that can carry a payload of up to 50 kg. A transport container can be provided at this location that is developed e.g., especially for receiving and transporting mail pieces as described in EP 24 33 854 A2. Additionally a lamp 68 is suspended at the U-shaped support 63. Additionally a display 67 is supported at this U-shaped support 63 wherein data for operating the vehicle 2 are displayable on the display 67.

The lower carrier element 40 and the upper carrier element 20 overlap in a vehicle center and are penetrated by a vertical support frame 50. The vertical support frame 50 includes a U-shaped bar with an upper horizontally oriented transversal beam 51 that is connected on both sides with a vertically descending branch 52 and 52' whose respective end is welded together with a respective lower outer longitudinal beam 42 or 42'. A roll bar 55 has two vertical supports 54 and 54' that are respectively connected with the upper transversal beam 51 and respectively connected with the lower rear transversal beam 41 of the lower carrier element 40. The roll bar 55 is arranged behind a driver seat rear element 13 and protrudes vertically far beyond a head of a driver seated on the driver seat 12, e.g. up to a height of 150 cm above the road way and protects the driver in case of an accident.

Figure 2B:
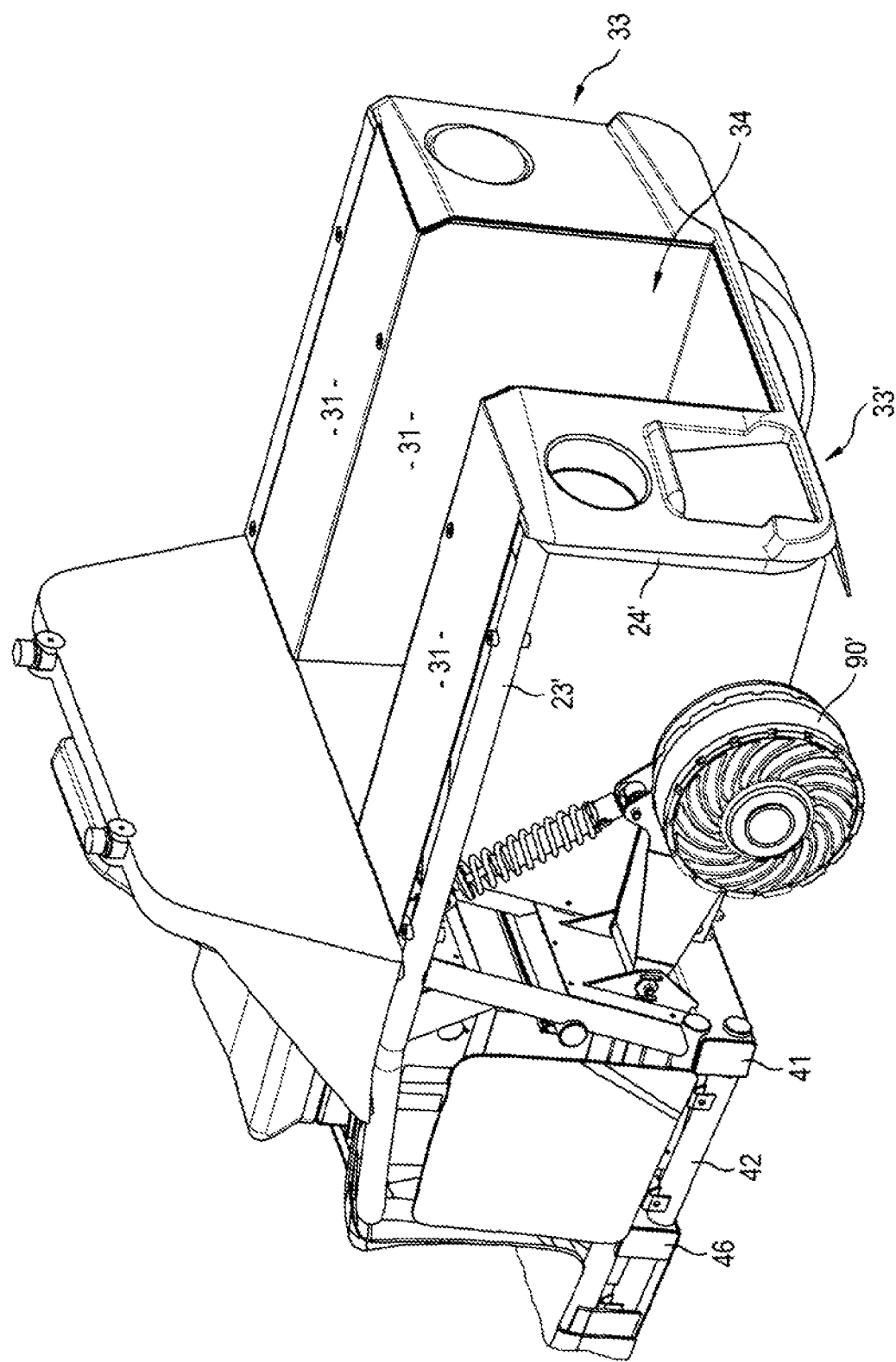
FIG. 2B illustrates a perspective view of both rear wheel assemblies offset from each other.

A protected compartment 59 is provided below the driver seat 12 between the two lower outer double tube longitudinal beams 42 and 42' wherein one or 2 vehicle batteries are arranged in the compartment. Typically two lithium ion vehicle batteries are provided respectively having a weight of approximately 30 kg and a storage capacity of approximately 5 kwh so that the vehicle 2 has a range of 100 km in normal driving operation. FIG. 2 schematically shows one of the batteries namely the vehicle battery 60. The two batteries can be attached onto rails that extend in the transversal direction and that are supported on rollers and that can be pulled out laterally after opening the compartment 59 to retrieve the batteries and charge them at an external charging station. Typically the two batteries remain on rails in the vehicle compartment 59 together with a charging system arranged there between and the charging is performed through a charging connection 29 that is arranged at a vertical vehicle rear wall 8. A typical charging system can be used for charging and is connect able to a typical public 16 ampere power outlet.

Figure 3B:
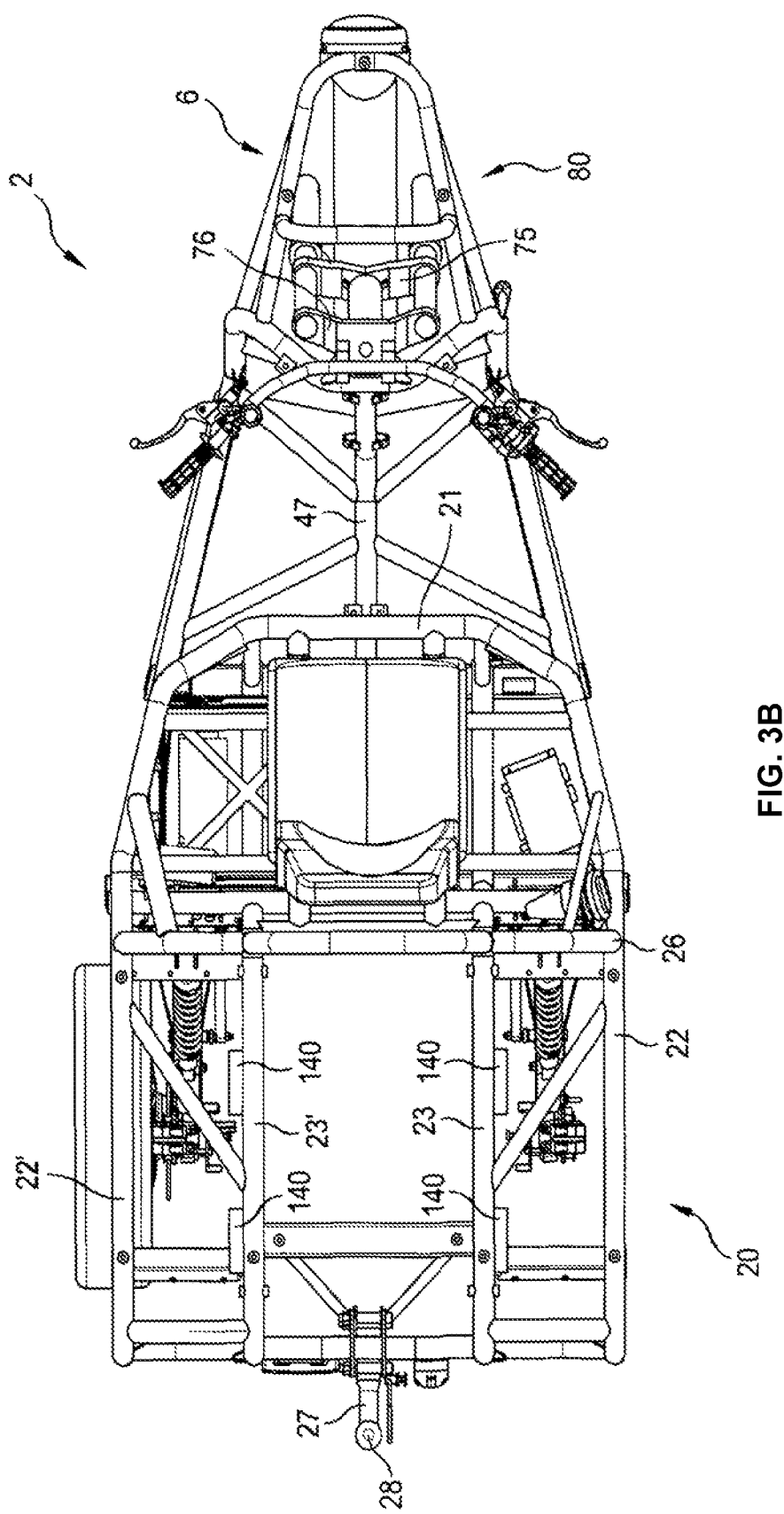
FIG. 3B illustrates top view of the vehicle according to FIG. 3A.
Figure 3C:
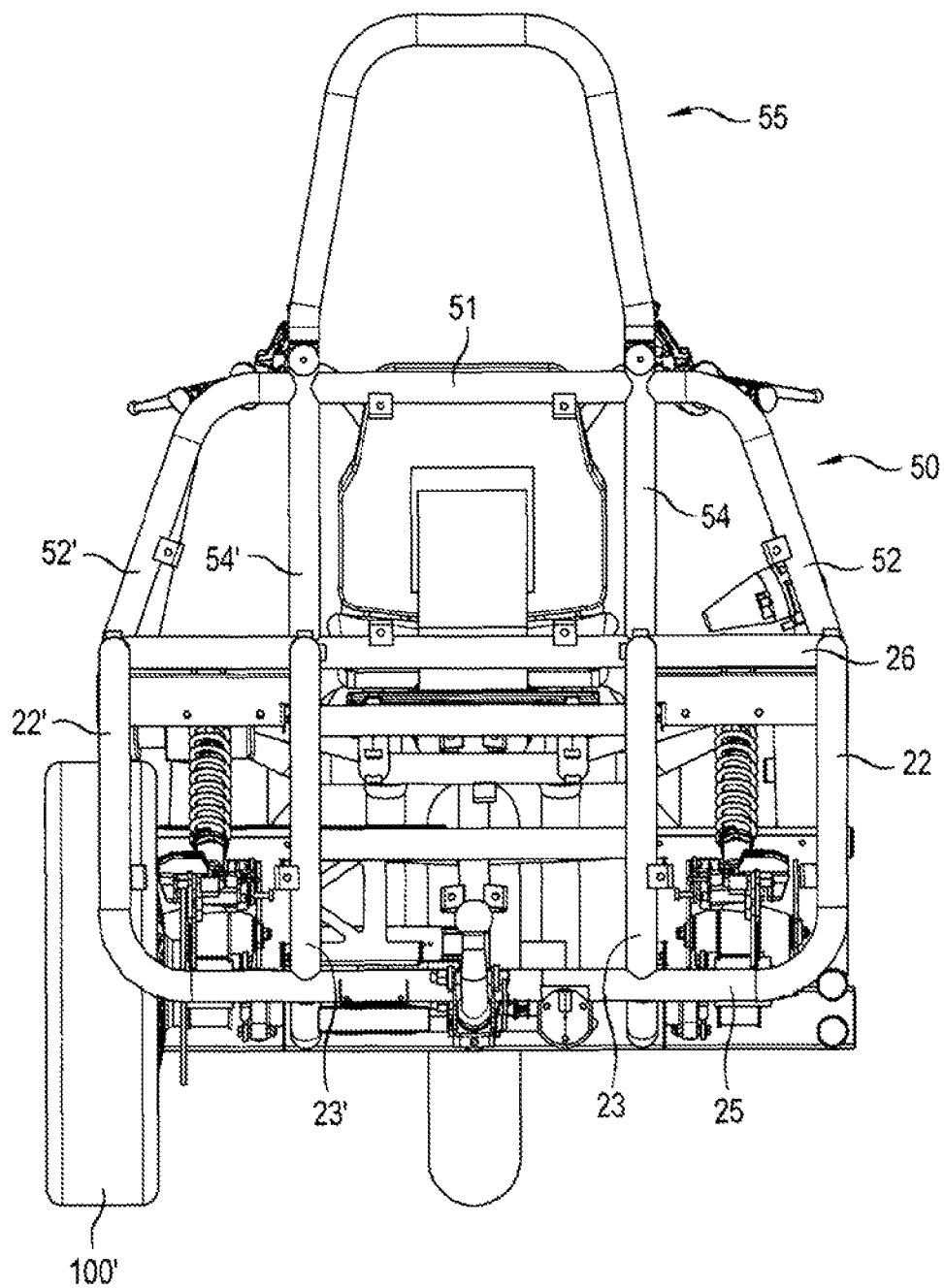
FIG. 3C illustrates a rear view of the vehicle according to FIG. 3A.

In addition to the elements recited and described supra the frame body 3 of the vehicle 2 can include additional supports and struts as evident in particular from FIGS. 3B and 3C which are not shown and described in detail for reasons of clarity, Overall, the vehicle 2 has a self-supporting torsion stiff body 3 configured in frame construction where the 3 vehicle wheels 70, 100 and 100' are attached.

The body 3 includes a vehicle faring 4 or a vehicle skin attached thereto. Typically the vehicle faring 4 is assembled from several molded synthetic material pieces that are advantageously made from polyethylene. The faring pieces includes vehicle side pieces 5 and 5', the vertical rear wall 8 an inner liner 9 of the dryer compartment 10 including foot space 11 and a driver seat back 13, furthermore a vehicle front 6 and last not least a cover 31 over the 2 arrangements of the support structure 30 and the rear wheels 100 and 100' arranged there under. A driver seat 12 is arranged within the driver compartment 10 and attached at the vehicle body 3 wherein the driver seat can include a safety belt.

Both rear wheels 100 and 100' of the vehicle 2 are motor driven. A respective wheel hub motor 90 or motor 90 is used for propulsion and rated fora power greater than 2 kW and less than 6 kW. Advantageously a commercially available product is used namely a standard type G2.4 motor by GEM Motors d.o.o., SI 1241 Kamnik, SI. This is a multi-face synchronous motor that has integrated motor control and a rotor with permanent magnets. Further details can be found on the internet under www.gemmotors.si.

Figure 4A:
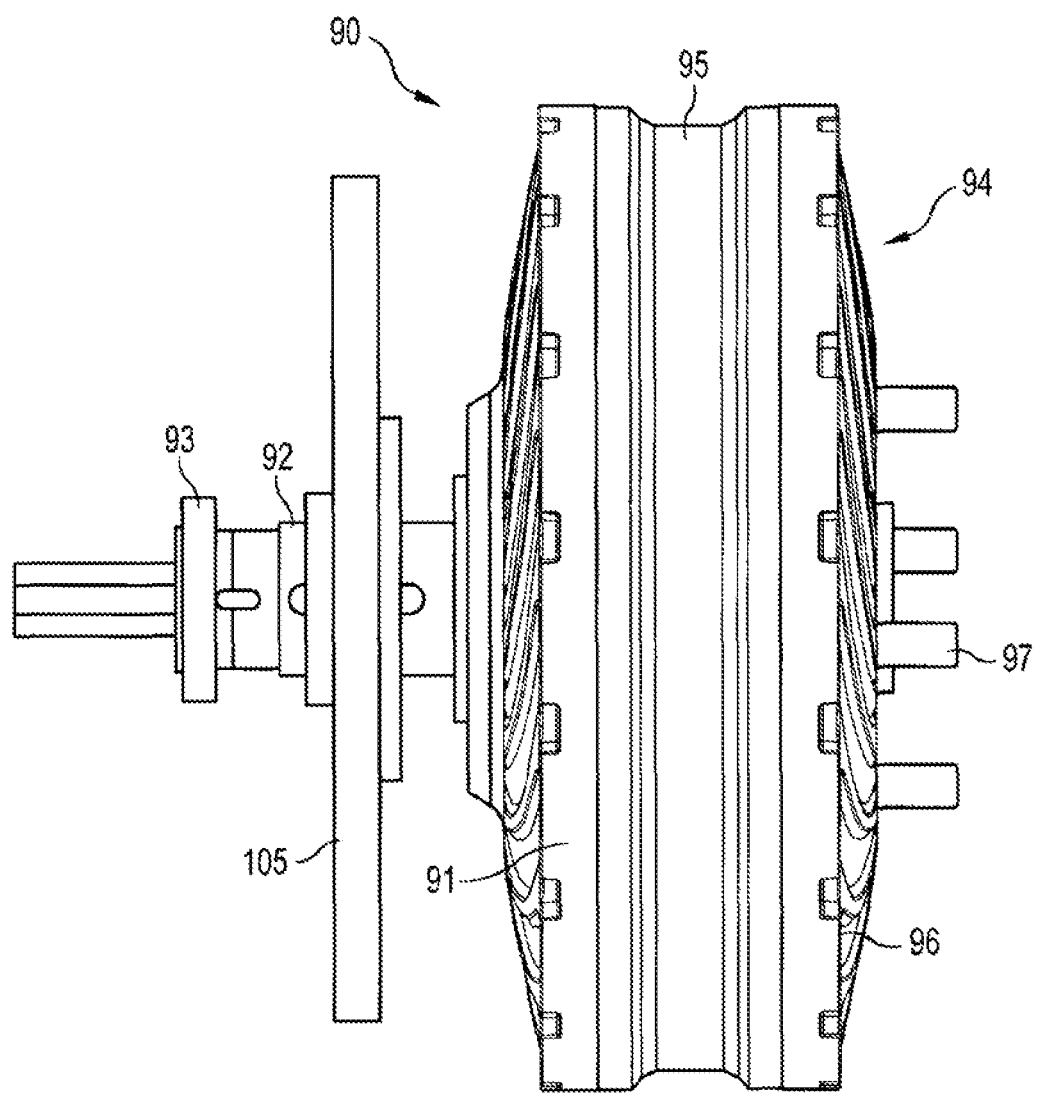
FIG. 4A illustrates a side view of a wheel hub motor installed according to the invention.
Figure 4B:
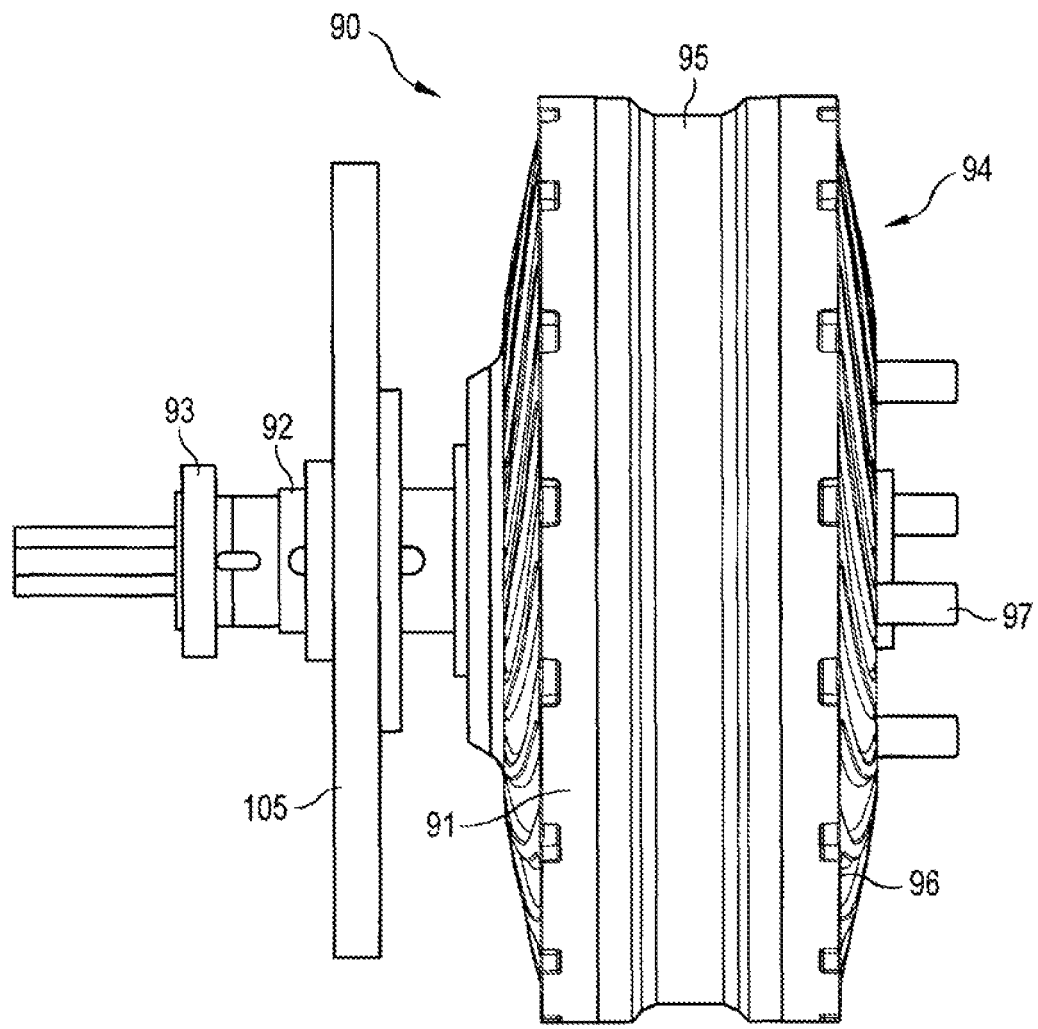
FIG. 4B illustrates a wheel rim with tire to be attached at the wheel hub motor according to FIG. 4A.

This motor 90 is illustrated in FIGS. 4A and 4B. The motor 90 essentially forms a circular disc shaped body with a diameter of 281 mm and a width of 140 mm. This body has a stator 91 that is configured to be fixed in place and is enveloped by a pot shaped rotor 94 that is made in one piece from a ring portion 95 corresponding to a pot circumference and an outer wall 96 corresponding to the pot base. Permanent magnets are mounted at an inner circumference of the ring portion 95 and rotate about stator poles at the rotor 91. The motor 90 is configured for one sided mounting. For this purpose, a axle journal 92 radially protrudes inward from the stator portion 91 with respect to the vehicle 2. Wherein the axle journal is connected torque proof with the stator portion 91.

Initially a brake disc 105 of a rear wheel disc brake system is mounted torque proof at the axle journal 92. Subsequently the axle journal 92 is inserted into an adapted bore hole at a wheel carrier 103 (FIG. 3A). A protruding bar at the axle journal 92 penetrates an accordingly configured groove at the wheel carrier bore hole to provide a torque proof fit between the axle journal 92 and the wheel carrier 103. A nut is threaded onto a thread 93 arranged at the axle journal 92 and secured. A seal ring is inserted between the stator 91 and the rotor 94 and prevents a penetration of dust and water. Bolts 97 protrude from the outer wall 96 and a rear wheel rim 98 with a rear tire 99 is mounted and fixed on the bolts. Advantageously a typical 15" motor cycle tire size 120/70 R15 is used as a rear tire 99. The rim 98, its rim bead and mounting of the tire 99 at the rim bead provide an arrangement where the rear tire 99 envelops the disc shaped motor 99 so that the motor 90 and the rear tire 99 are radially aligned. The motor 90 forms a part that is permanently mounted and stationary at the wheel suspension so that the rim 98 and the rear tire 99 can be separated and replaced easily which is typical for a car tire. The axle journal 92 is hollow and cables are run through the resulting bore hole wherein the motor 90 is provided with current voltage and signals through the cable.

The motor 90 is operated with a DC voltage of 48 V which is provided by the vehicle batteries 60. The motor is configured for a nominal torque of 145 nm; the vehicle 2 reaches a maximum speed of 45 km/h with the 15 inch rear tires at a motor speed of approximately 480 rpm. The motor 90 is provided with an integrated motor control that communicates through a typical CAN network with the controller at the vehicle body. Between the controller and each motor control, there is mutual data exchange. The controller controls the motor control at each motor which in turn causes the associated motor to operate as predetermined by the controller. The wheel hub motor is configured to run in both directions so that the same motor can be used at both rear wheels 100 and 100' of the vehicle 2 which then merely switches the main operating direction.

Each rear wheel 100, 100' is supported by a respective wheel carrier 103, 103' of a wheel suspension at the vehicle body 3. Each wheel carrier 103 103' is supported by a respective spring damper 112, 112' at an upper outer longitudinal beam 22, 22' of the upper carrier element 20 of the vehicle body 3.

Each rear wheel 100, 100' is connected torque proof with a brake disc 105 of a rear wheel disc brake system that is configured with an electromechanical parking brake. This brake disc 105 is mounted torque proof at a wheel journal 92 of the wheel hub motor 90, 90', A brake caliper 106 is associated with each rear wheel brake disc 105 and fixed at the wheel carrier 103 by a mounting plate 104. The components of a hydraulically actuated brake piston/brake cylinder arrangement and the components of an electromechanical parking brake are arranged at/in the brake caliper 106. Two adjustable brake pads are associated with the brake caliper 106 that are pressed against the brake disc 105 when the brake piston is adjusted hydraulically or electromechanically so that the brake pads brake the rear wheel 100, 100', These brake pads are actuated by the hydraulic brake device at the handle bar 81 when the pivotable brake handle 83 is pulled wherein the hydraulic brake device also supplies the disc brake system at the front wheel 70 with hydraulic pressure. Thus, a brake piston/brake cylinder arrangement is arranged in the brake caliper 106 of the rear heel disc brake system wherein the brake piston is loadable with the pressure of the hydraulic fluid which is supplied to each rear wheel disc brake system by a respective hydraulic medium conduit.

Additionally the brake pads of each rear wheel disc brake system can also be actuated by the electromechanical parking brake whose components are arranged in brake caliper 106 of each rear wheel disc brake system. Among these components there is an electric parking brake motor which drives a multi-stage transmission with a high step down gearing ratio through a cog belt wherein the transmission is in turn driven by a spindle provided with an external thread which causes a feed nut that is coupled with the brake piston to rotate. Depending on a direction of rotation of the spindle, the feed nut is moved back and forth in the spindle thread, A forward movement brings the feed nut in contact with the brake piston and adjusts the brake piston within the brake cylinder. Due to the high step down transmission ratio e.g. up to 50 to 1 a high amount of force is transferred to the brake shoes and their brake liners which bring the wheel to a standstill reliably and permanently. The rear wheel coupled with the electromechanical parking brake is transposed into a parking brake mode, where a rotation of the rear wheel is prevented. Each electromechanical parking brake has a parking brake control unit that is integrated into the brake caliper and controlled by the controller 15. During activation of the parking brake the parking brake motor pulls a current which is detected by the parking brake control unit and reported to the controller 15; consequently the controller 15 knows the parking brake mode condition of each rear wheel 100, 100'. The spindle mechanism is self-blocking so that a parking brake mode provided by the activated parking brake also remains blocked and effective when the vehicle is without power. In an emergency brake situation, the parking brake mode can be activated in addition to pulling the brake handle at the handle bar and initiating the regular hydraulically actuated brake process. Since this parking brake process works rather abruptly the controller 15 checks the current vehicle speed and only initiates the parking brake mode for the moving vehicle when the vehicle velocity is less than or equal to 2 km per hour.

The hydraulically actuate able rear wheel disc brake system with integrated electromechanical parking brake provided at the vehicle according to the invention for the rear brakes can be sourced especially from:

Continental Automotive GmbH, 30165 Hanover, DEUSCHLAND under the technical name EPB-Ci (stands for:

Electric Parking Brake-Caliper Integrated); Continental Part No. 11.6236-0089.4 for a brake system on the left rear wheel and Continental Part No. 11.6236-0090.4 for a braking system on the rear right wheel.

The rear wheel assembly according to the invention with the disc shaped wheel hub motor 90, 90' and wheel rim 98 with rear wheel tire 99 attached thereto without transmission wherein the rear wheel tire radially envelops the disc shaped motor in a disc direction and including the wheel suspension including the wheel carrier 103, supporting the motor 90 including the wheel 99 at the body 3 can be fabricated with a comparatively small width which typically only amounts to one third of an entire vehicle width. Consequently there is a free space 34 in a rear portion of the vehicle 2 below the virtual loading surface 32 between the two rear wheel assemblies 33, 33' arranged with an offset from each other wherein a width of the free space 34, covers approximately one third of the vehicle width and can be used for transportation purposes. A closed transport container that is designated as auxiliary container 35 and fixed at the vehicle body 3, can be inserted into this free space 34.

This auxiliary container 35 has an interior that is accessible through an open pivotable door 36 in a vertical vehicle rear wall 8. A paired assembly of rails telescoping into each other can be arranged at a base of this auxiliary container 35 wherein a slide runs on the rails that can be run out from the auxiliary container interior through the open pivotable door 36 to be loaded with goods to be transported.

As described supra the upper carrier element 20 includes a paired arrangement of upper outer longitudinal beam 22 or 22' and upper inner longitudinal beam 23 or 23' above each rear wheel 100, 100' wherein all beams are arranged in a plane parallel to a vehicle longitudinal axis and oriented in the vehicle longitudinal axis. These longitudinal beams 22, 22', 23, 23' jointly form a support structure 30 where a replace able transport container 120 is mountable and fix able according to the invention. This transport container 120 is temporarily supported at the support structure 30 by a quick release system described in detail infra. The support structure 30 is covered by a cover 31 which encloses each rear wheel assemblies 33 as evident from FIG. 2B.

Typically this transport container covers an entirety of the virtual loading surface 32. The transport container 120 essentially forms a square box that is closed on all sides including a base wall 121, a ceiling wall 126 and circumferential side walls 127 including the rear wall 128. FIG. 5A shows the rear wall 128 of the transport container 120. The walls of the transport container 120 can be made from typical sheet material made from light metal, synthetic material synthetic composite material, wood and similar. Alternatively a framework of metal rods can be used with tarps attached thereto. One or plural closable doors are formed at the transport container walls wherein a transported goods stored in the transport container interior are accessible through the close able doors. Elongated hollow profiles 122 and 122' are arranged at an inside of the base wall 121 offset from each other and extending in a vehicle longitudinal direction wherein the hollow profiles 122 and 122' define a tunnel with a rectangular or semi-circular cross section that is open towards the transport container rear wall 128 so that a fork of a forklift or of another lifting device can move into each tunnel in order to lift the transport container 120 supported on the vehicle 2 after the locking device 140 of the quick release system has been unlocked. Plural pin shaped locking bars 142 protrude from the outside of the base wall 121 wherein the locking bars fix the transport container 120 supported on the vehicle 2 at a locking device 140 attached at the vehicle.

FIG. 5B shows an alternative transport container which is designated herein as common transport container 130. This common transport container 130 is obtained in that a tub is applied to the accordingly cut out base wall 121 of the transport container 120 wherein the tub is made from the circumferential side walls and the base wall of the auxiliary container 35. Consequently the tub fits into the free space 34 between the 2 rear wheel assemblies 33 and 33' when the common transport container 130 is supported at the vehicle body 3 on the support structure 30. The transport container 120 forms a common interior volume together with the auxiliary container 35 attached thereto wherein the common interior volume can be used for transportation purposes.

The actual sport container 120 typically forms a cuboid box which is arranged at the vehicle 2 with a box longitudinal direction arranged in the vehicle width direction. The cuboid but smaller auxiliary container 35 is applied to the transport container base wall 121 centrally and with the transport container longitudinal direction orthogonal to the transport container longitudinal direction so that a joint transport container 130 is obtained that is made from the actual transport container 120 and the auxiliary container 32. The common transport container has an essentially T-shaped cross section in a vehicle width direction wherein the actual transport container 120 forms a T-bara 134 and the auxiliary container 35 forms a T-trunk 135. The common transport container 130 has a base wall section 131 and 131 adjacent to both auxiliary container side fronts 132 and 132' wherein the at least one locking bars 123 of the connecting device according to the invention protrude vertically. Subsequently the base wall of the actual transport container 120 and the two base wall sections 131 and 131' of the common transport container 130 are jointly designated as base wall 121.

FIG. 6A shows essential components of an embodiment of the locking device 140 according to the invention. Herein the locking bars 142 arranged at the transport container base wall 121 forms a straight elongated circular pin that is integrally formed at one piece at an attachment plate 141. The pin shaped locking bars 142 and the attachment plate 141 are typically made from steel. Bore holes are recessed in the attachment plate 141 and threaded bolts can be run through the bore holes which attach the attachment plate 141 at the outside of the transport container base wall 121 so that the pin shaped locking bars 142 protrudes vertically downward from the base wall 121. The locking bars 142 has a locking bars enveloping surface 143 with a circumferential pin groove 144 recessed therein. In the instant embodiment the locking bars 142 has a length of approximately 5 cm.

FIG. 6B shows an alternative locking bar 145 which is formed from a straight elongated arm 147 of a band shaped angle piece that is made from steel. This arm 147 includes a bore hole 148 orthogonal to a longitudinal direction of the arm 147 wherein a blocking member of the locking device is insert able into the bore hole 148. The other arm 146 of the angle piece can be applied and attached at the outside of the transport container base wall 121.

As illustrated in FIG. 6A, a vertically protruding mounting plate 108 is welded to a tube section of the upper inner longitudinal beam 22 and oriented towards the upper outer longitudinal beam 22 wherein bore holes for passing threaded bolts are cut out from the mounting plate 108. These threaded bolts are used to attach a typically square or cuboid lock body 150 at the mounting plate 108 wherein the lock body includes a first side surface 151 and an opposite side surface 152. A receiving bore hole 153 is recessed in this lock body 150 wherein the pin shaped locking bar can penetrate into the receiving bore hole. In addition to the receiving bore hole 153 a blocking bore 154 is recessed in the lock body 150 wherein the blocking bore 154 is oriented orthogonal to the receiving bore hole 154 and partially intersects the receiving bore hole 153. Additionally an elongated cylindrical blocking member 157 is provided which has a diameter that is slightly smaller than a diameter of the blocking bore 154 so that the blocking member 157 inserted into the blocking bore 154 is move ably supported within the blocking bore 154. As illustrated in the sectional views of FIGS. 7A, 7B and 7C, this provides in a locking bar retaining position that the pin shaped locking bar (142) is inserted into the receiving bore (153);

the blocking member (157) is inserted into the blocking bore (154): and a blocking member section (158) occupies a common volume section in the receiving bore (153), in the pin groove (144) and in the blocking bore (154) and thus retains the locking bar (142) in the lock body (150) by positive form locking.

Furthermore FIG. 6A shows a first electric motor 160 that is arranged in a cuboid housing 161. After being activated by the controller 15 a motor driven shaft 162 of the first electric motor 160, a lever 163 pivot ably connected through a connection piece 164 with the blocking member 157. When the lever 163 is oriented towards the lock body 150 the blocking member 157 is inserted into the blocking bore hole 154 as far as possible. In particular the blocking member 157 is in the locking bar retaining position shown in FIG. 7A where the blocking member section 158 engages the pin groove 144 and retains the locking bar 142 by positive form locking within the receiving bore hole 154.

As illustrated in FIG. 6A, an angle piece 165 is provided including a first arm 166 with a rectangular cut out 167 into which the electric motor housing 161 can be inserted and fixed therein in particular by fasteners in particular bolts and nuts. The angle piece 165 has a second arm 168 where a pass through opening 169 for the blocking member 157 is recessed. This second arm is applied to the second side surface 152 of the lock body 150, that is opposite to and remote from the mounting plate by threaded bolts. The first electric motor 160 inserted into the recess 167 is arranged at a fixed predetermined distance from the lock body 150 and the blocking member 157 adjusted by the lever 163 can assume the locking bar retaining position reliably.

Figure 6C:
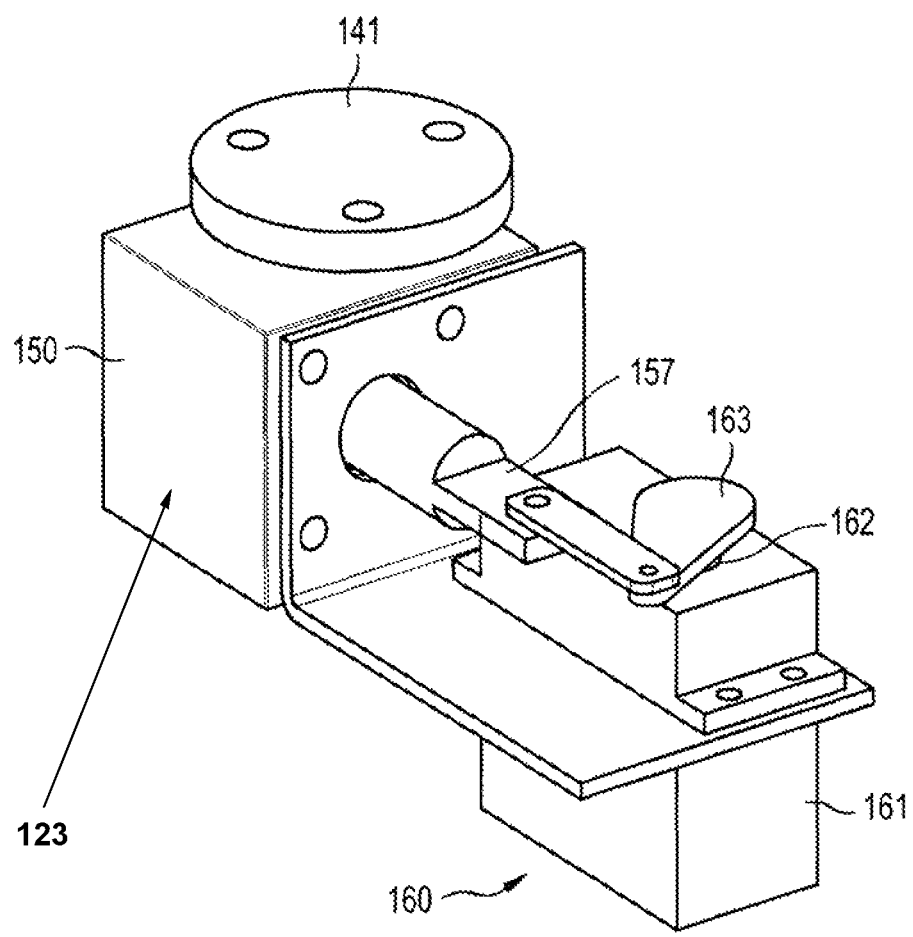
FIG. 6C illustrates the locking device in assembled condition.

FIG. 6C shows the locking device 140 made from the components recited supra completely assembled. The blocking member 157 is in the locking bar release position.

Figure 7A:
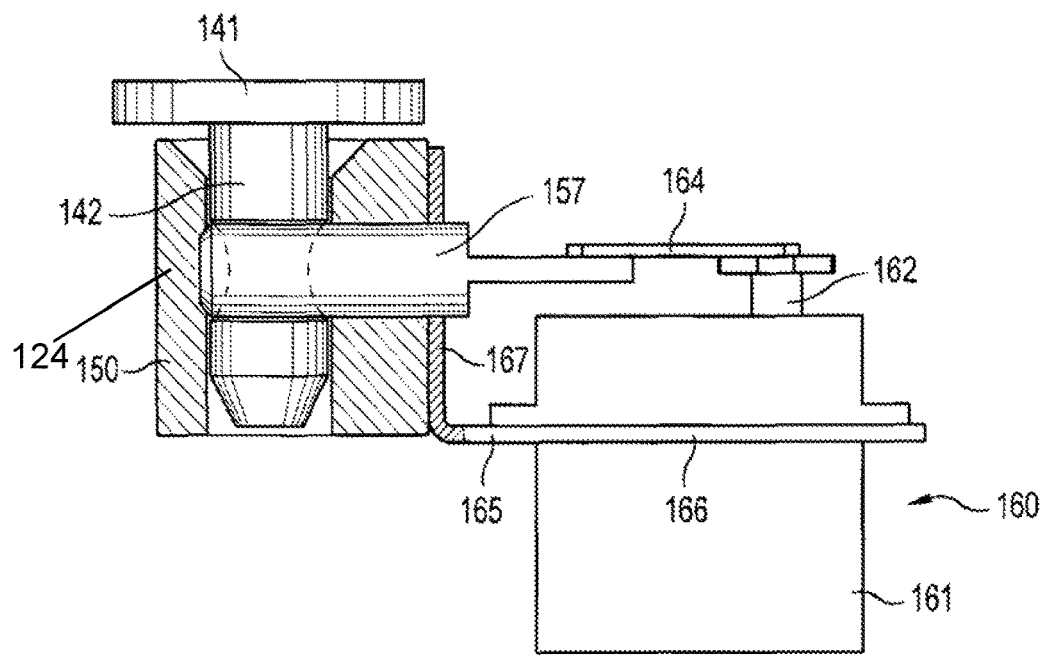
FIGS. 7A, 7B and 7C illustrate partially broken sectional views of a lock body showing a locking bar retaining position.
Figure 7B:
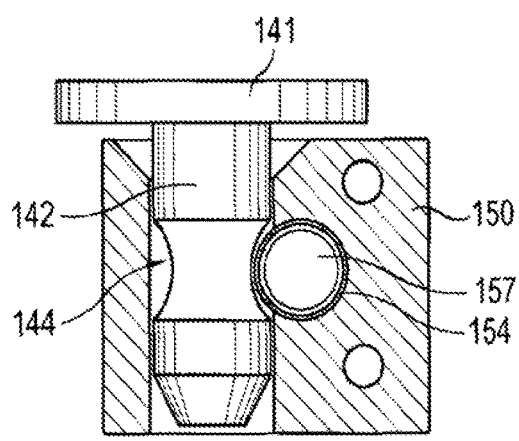
Figure 7C:
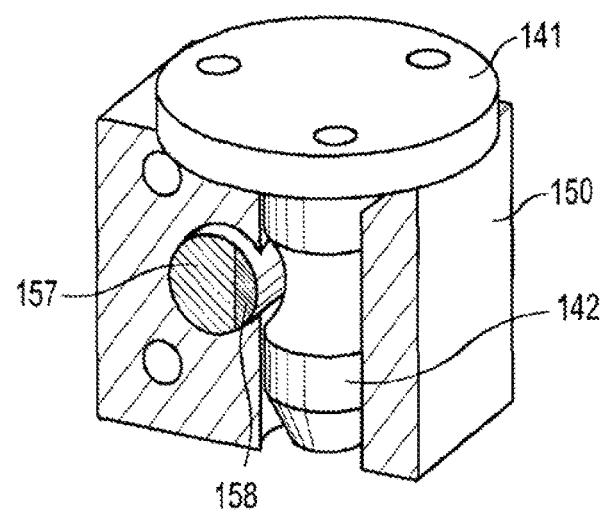

FIGS. 7A, 7B and 7C show partially broken sectional views of the lock body 150, the locking bar 142 inserted into the receiving bore hole 153 and the blocking member 157 inserted into the blocking bore 154. The blocking member 157 is in the locking bar retaining position in FIG. 7A and it is evident from FIGS. 7B and 7C how the blocking member section 158 engages the pin groove 154 in this position and thus retains the entire locking bar 142 in a receiving bore hole of the lock body 150.

Figure 8A:
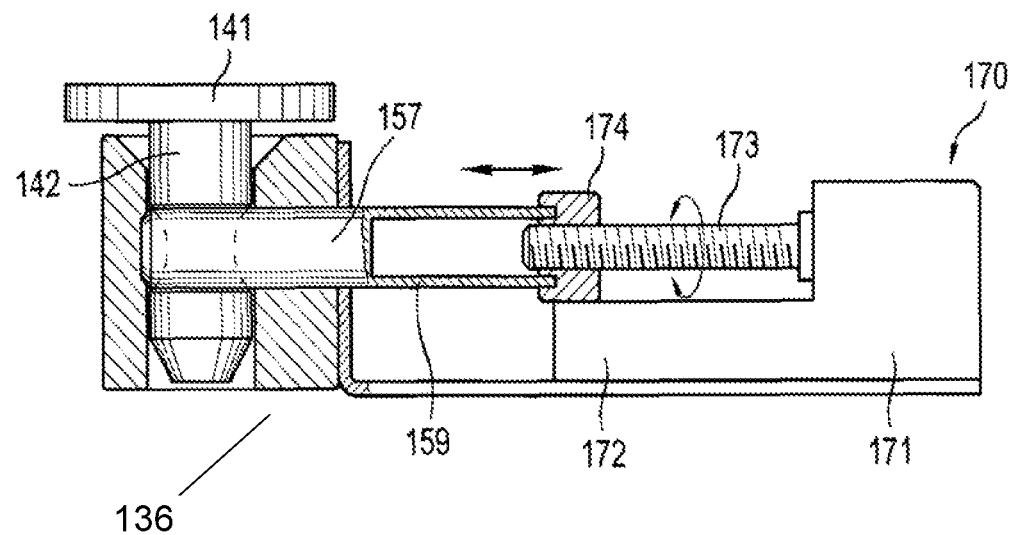
FIG. 8A illustrates the locking bar retaining position achievable with an alternative electric motor.
Figure 8B:
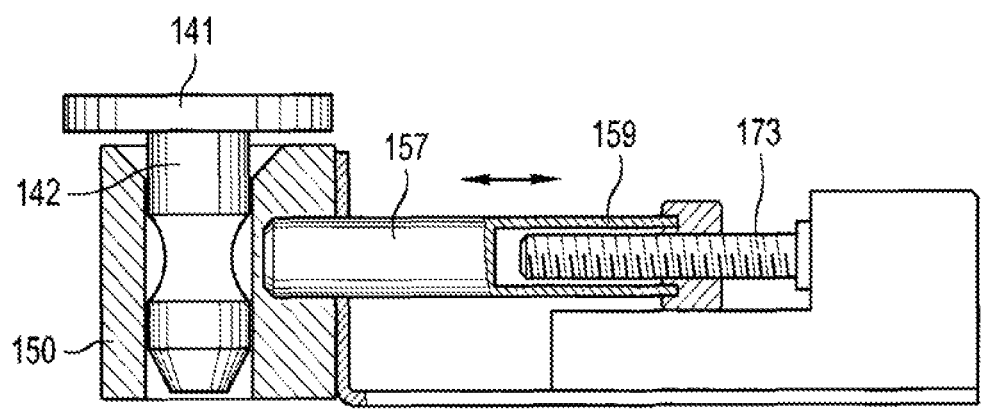
FIG. 8B illustrates the locking bar release position achievable with the alternative electric motor.

FIGS. 8A and 8B show an alternative electric motor in the locking device 140 according to the invention. The alternative electric motor 170 is configured as an electric stepper motor and includes a housing 171 that is attached on the first arm 166 of the angle piece 165. The alternative motor 170 drives a horizontally oriented spindle 173 whose external thread engages a feed knot 174 which is supported axially move able and torque proof along a stop protruding from the engine housing 171. A blocking member sleeve 159 is integrally provided in one piece at the blocking member 157 at an end that is remote from the lock body 150, wherein an end of the blocking member sleeve 159 is fixed at the feed nut 174. The spindle 173 can enter the interior of the blocking member sleeve 159.

Depending on the direction of rotation of the spindle 173, the feed nut 174 and the blocking member 157 coupled therewith is moved towards the lock body 150 or away therefrom. A movement oriented towards the lock body 150 adjusts the blocking member 157 into the locking bar retaining position illustrated in FIG. 8A and a movement away from the lock body 150 adjusts the blocking member 157 from the locking bar retaining position into the locking bar release position illustrated in FIG. 8B. The alternative electric motor 170 configured as stepper motor will perform the required number of spindle rotations according to the controller 15 to provide the adjustment travel of the blocking member 157.

Figure 9A:
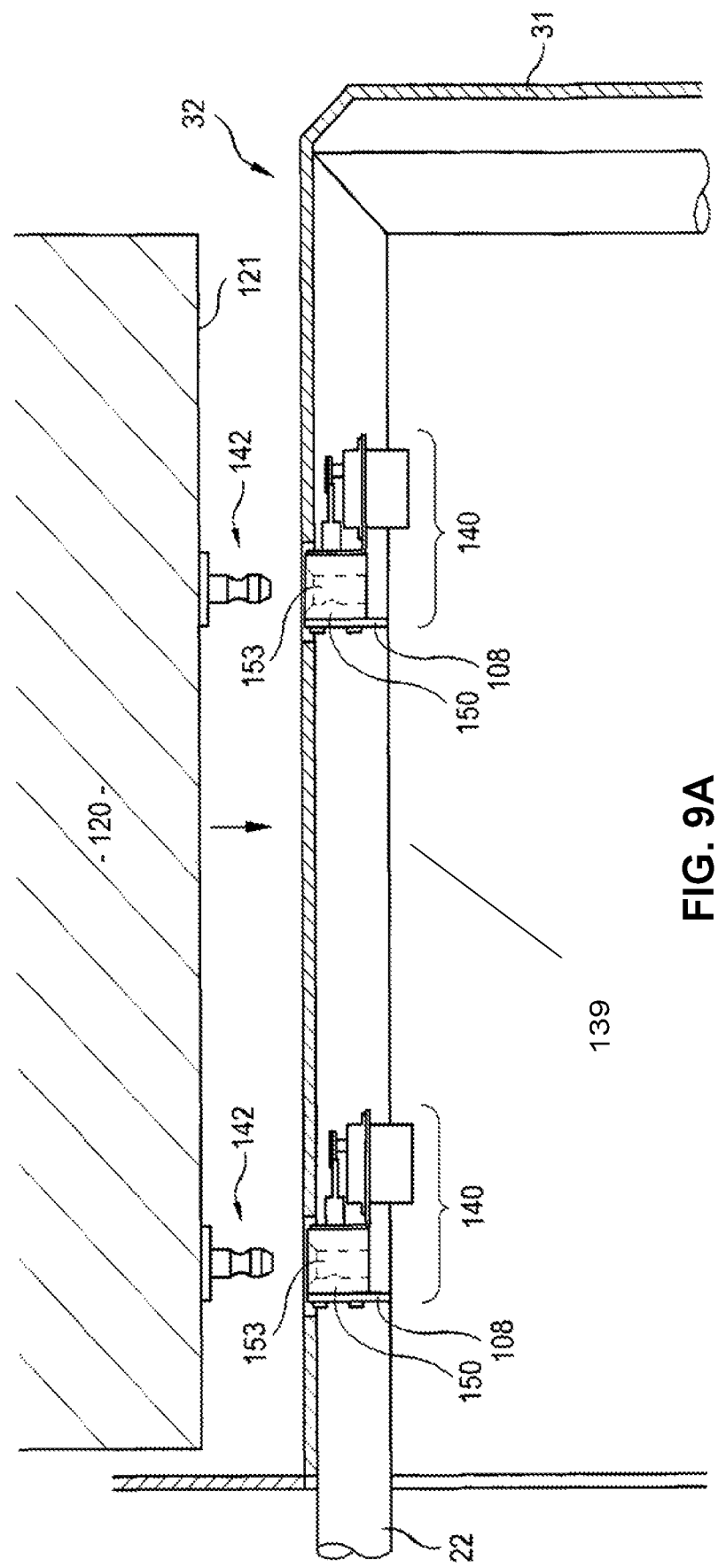
FIGS. 9A and 9B illustrate an approach or a placement of the transport container at/on a virtual loading surface at the vehicle.
Figure 9B:
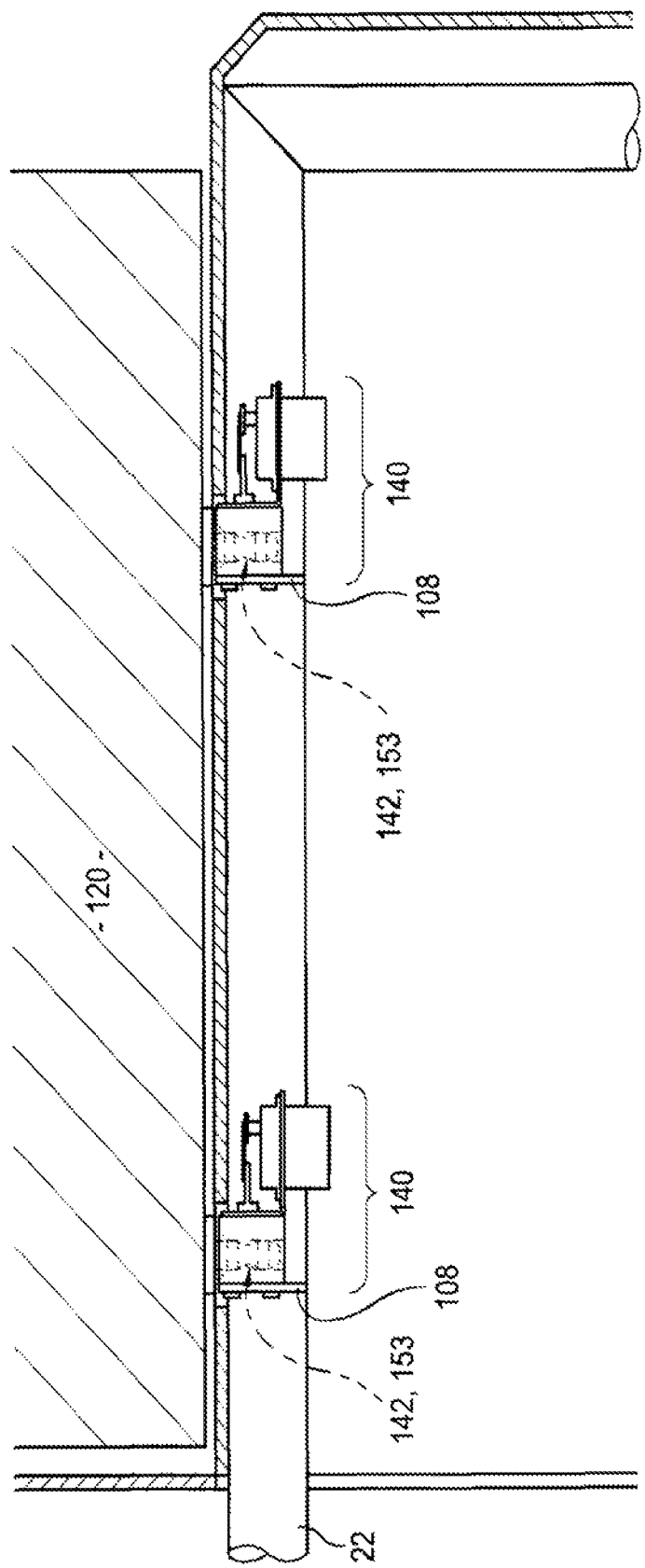

FIGS. 9A and 9B show the transport container 120 approaching and contacting the virtual loading surface 32 that is indicated by a cover 31 over the upper inner longitudinal beam 23 of the support structure 30. FIG. 9A shows the base wall 121 of the transport container 120 at some distance from the cover 31. Two pin shaped locking bars 142 protrude vertically from the base wall 121 and are arranged at a distance from each other. Two locking devices 140 are attached by a respective mounting plate at the upper inner longitudinal beam 23. Each locking device 140 includes a lock body where a dashed receiving bore hole 153 is cut out. Arrangements are implemented where each locking bar 142 arranged at the lowering transport container 120 can penetrate the corresponding receiving bore hole 153.

FIG. 9B shows the transport container 120 placed onto the cover 31. Each locking bar 142 has entered the associated receiving bore hole 153. After the blocking member 157 has been moved from the initial locking bar release position into the locking bar retaining position by the respectively activated electric motor 160, 170 the locking bar 142 is retained within the locking device 140 and locked and the transport container 120 is fixed at the vehicle 2 safe for driving.

Figure 10A:
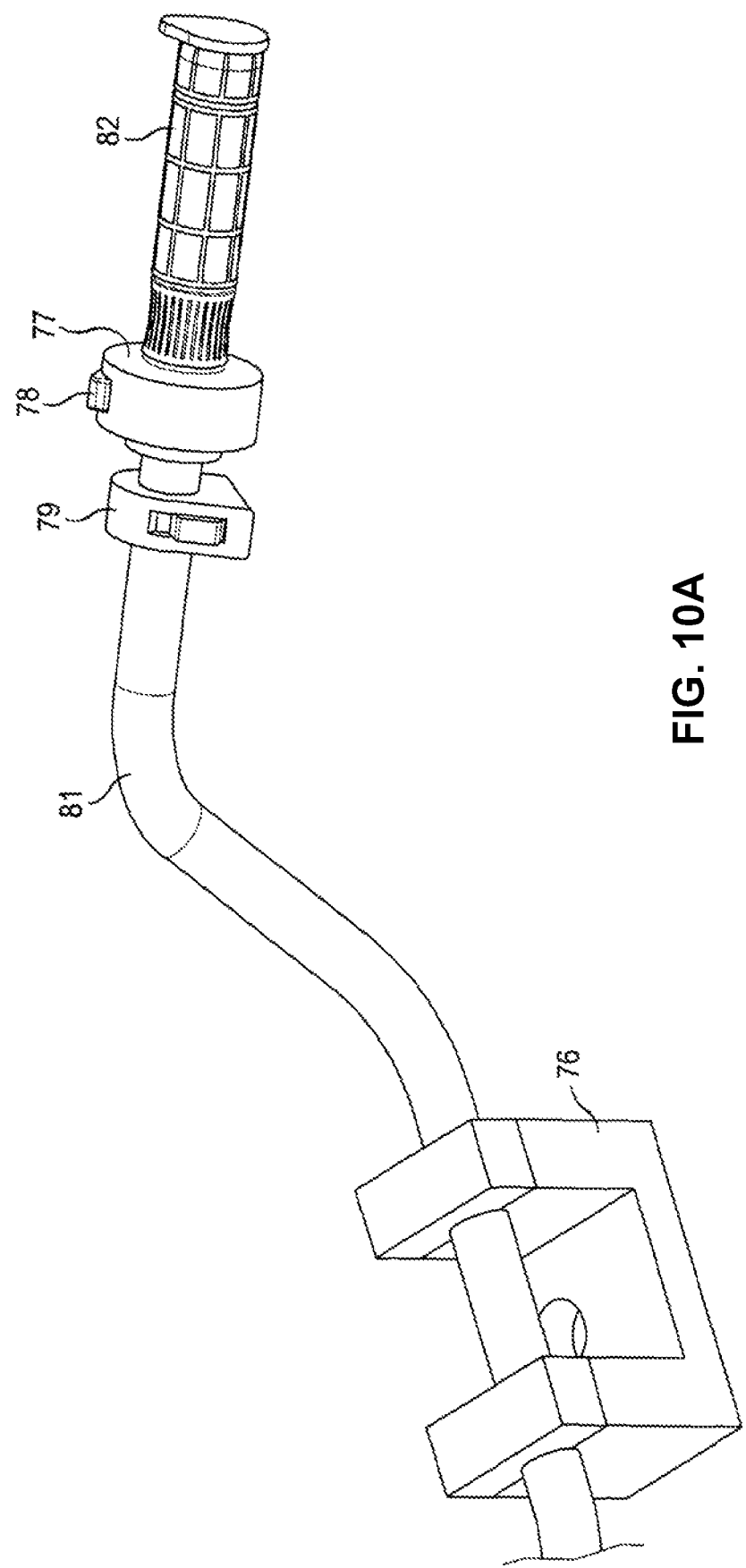
FIG. 10A illustrates a perspective view of a right section of a vehicle handle bar with acceleration twist grip and various electromechanical switches.
Figure 10B:
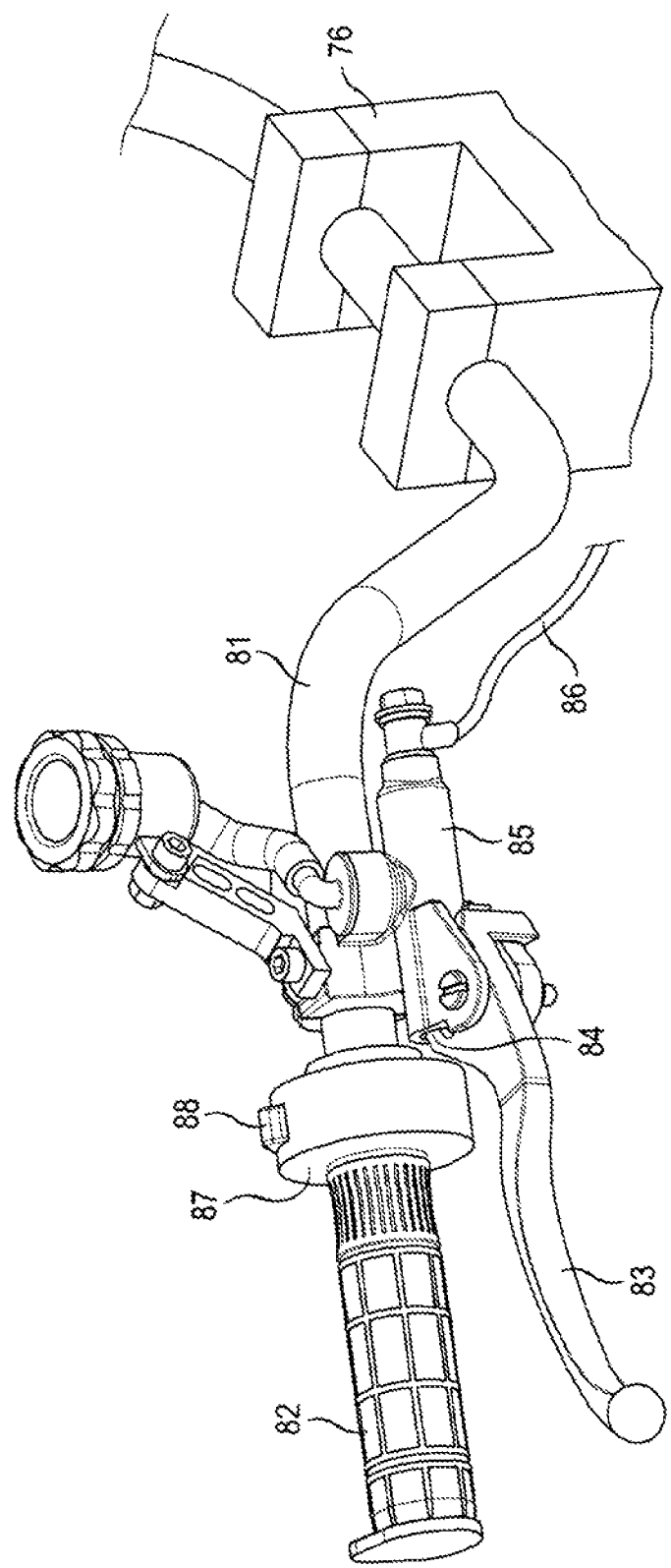
FIG. 10B illustrates a perspective view of a left section of the vehicle handle bar including brake handle, hydraulic piston/cylinder arrangement and various electromechanical switches.

FIGS. 10A and 10B show sections of the handle bar 81 mounted at the telescopic suspension fork 80. FIG. 10A shows a right end section of the handle bar 81 as viewed by a driver sitting on the driver seat 12 and FIG. 10B shows a left section of the vehicle handle bar in a front view of the vehicle. A pivotable spring loaded brake handle 83 is arranged at a left end section of the vehicle handle bar wherein the brake handle is provided with a pivotable push rod 84. Pulling the brake handle 83, causes the push rod 84 to penetrate into a sleeve 85 in which a piston/cylinder arrangement of a hydraulic brake device is arranged. This implements a two stage operation. Initially the push rod 84 actuates an electric switch which then generates an electric brake signal as fed to the controller 15 which subsequently generates a motor brake signal that is fed to both motor controls which subsequently control each motor 90, 90' into a motor brake mode in which vehicle motion energy is recuperated into electric energy which is fed to the vehicle batteries. Only when pulling the brake handle 83 further, the push rod 84 presses onto the piston of the piston/cylinder arrangement of the hydraulic brake device and increases a hydraulic fluid pressure in the cylinder which is then fed to the disc brake systems at all 3 vehicle wheels 70, 100 and 100' through a hydraulic fluid conduit 86 and other hydraulic fluid conduits. The front wheel 70 is only configured with a hydraulically actuate able disc brake system. Each rear wheel 100, 100' is configured with a rear wheel disc brake system that has a hydraulically actuate able brake piston/-brake cylinder arrangement. Pulling the brake handle 63 also loads the brake piston of this brake piston/-brake cylinder arrangement with increased hydraulic medium pressure and the 2 rear wheels 100, 100' are braked hydraulically. Subsequently, a smooth reduction of the vehicle velocity is provided in addition to the motor braking by activating the brake discs at all 3 vehicle wheels 70, 100 and 100'. Additionally the rear wheel disc brake systems at the 2 rear wheels 100 and 100' are each provided with the electromechanical braking brake described supra.

In addition to the brake handle 83 a signal ring 87 with various electromechanical switches in mounted at a left end section of the vehicle handle bar 81. Among these are switches for activating lights and signal lights and a parking brake switch 88 that can assume a parking brake on position or a parking brake off position. A movement of the parking brake switch 88 from a starting position into a different position sends an electrical signal to the controller 15 which will subsequently activate the electric motor in the brake caliper 106 of each rear wheel disc brake system in order to put each rear wheel 100, 100' into the corresponding parking brake condition.

An acceleration twist handle 82 is mounted at a right end section of the vehicle handle bar 81. A signal ring 77 is fixed adjacent to the acceleration twist grip 82 with additional electrical switches arranged thereon, among others a flip switch 78 which is an emergency switch. Actuating the flip switch 78 immediately stops all electrical activities at the vehicle 2. A slide controller is arranged below the flip switch 78 at the signal ring 77, which can assume 2 different positions that can adjust a forward driving and a backward driving mode at the vehicle 2. In order to control the vehicle 2 into the backward driving mode, the brake handle 83 has to be pulled and the slide controller has to be adjusted accordingly simultaneously.

In addition to the signal ring 77 an additional switch arrangement is arranged at a right end section of the vehicle handle bar 81 including an electro mechanical locking switch 79. The locking switch 79 can move into a lock on position or a lock off position. The locking bar retaining position of the blocking member 157 is associated with the lock on position of the locking switch 79. The locking bar release position of the blocking member 157 is associated with the lock off position of the locking switch 79. Adjusting the locking switch 79 from a starting position into another position sends an electrical signal to the controller 15 which subsequently activates the electric motors 160 or 170 of all locking devices 140 to perform the corresponding adjustment of the blocking member 157. In response to a lock off position the controller 15 will only cause an adjustment of the blocking member 157 from the locking bar retaining position into the locking bar release position when it has been checked and confirmed that each rear wheel 100, 100' is in parking brake mode.

REFERENCE NUMERALS AND DESIGNATIONS 2 vehicle, electric vehicle
3 body
4 fairing
5, 5' side piece
6 front side
7 back side
8 vertical vehicle rear wall
9 driver compartment liner
10 driver compartment
11 driver foot space
12 driver seat
13 driver seat back
15 circuit board
20 upper support element
21 upper transversal beam
22, 22' upper outer longitudinal beam
23, 23' upper inner longitudinal beam
24, 24' downward sloping tube
25 lower horizontal cross beam
26 front upper cross-beam
27 neck of ball coupling
28 ball coupling
30 support structure
31 cover
32 rear virtual loading surface
33, 33' rear wheel assembly
34' clearance space between two rear wheel assemblies
35 auxiliary container
36 pivotable door of auxiliary container
37 front loading surface
38 front cargo basket
40 lower support element
41 lower rear transversal beam
42, 42' lower outer double tube longitudinal beam
43, 43 single-tube pillar
44 rearward oriented bridge
45 solid block
46 lower center cross beam
47 lower center longitudinal beam
48 front end section of lower center longitudinal beam
49 forward protecting barrier
50 vertical support frame
51 upper horizontal crossbar
52, 52' vertically descending branch
53 lower center crossbar
54, 54' vertical support of roll bar
55 roll bar
59 battery compartment
60 battery
63 U-shaped support
65, 65' support
67 display 68 hanging lamp
70 steerable front wheel
71 front wheel rim
72 front wheel tire
74 lower tube of telescopic suspension fork 80
75 lower fork bridge of telescopic suspension fork 80
76 upper fork bridge of telescopic suspension fork 80
77 signal ring at the right-hand end portion of the vehicle handlebar 81
78 toggle switch at the signal ring 77
79 locking switch
80 telescopic suspension fern.
W steering head angle
81 vehicle handlebar
82 acceleration twist grip
83 brake handle
84 pushrod mounted at the brake handle body
85 sleeve
86 hydraulic fluid line
87 signal ring at the left end portion of the vehicle handlebar 81
88 parking brake switch
90 wheel hub motor or motor incl. control
90' wheel hub motor or motor incl. control
91 stator of motor
92 axle journal at stator
93 terminal thread on axle journal
94 turned part
95 annular part
96 outer wall of turned part
97 bolt
98 rear wheel rim
99 rear wheel tire
100, 100' rear wheel
101 rear wheel disk bake system
103 wheel carrier
104 support plate for brake caliper
105 brake disc of rear wheel disc brake system
106 brake caliper of rear wheel disc brake system
108 mounting plate for locking device
120 exchangeable transport container
121 base wall of transport container 120
122, 122A hollow profile
123 locking bolt position sensor
124 blocking member position sensor
126 top wall of transport container 120
127 circumferential side wall
128 rear wall of transport container 120
130 common transport container
131, 131' base wall section of transport container 130
132, 132' side face of the auxiliary container 35
134 T-bar at T-shaped transport container 130
135 T trunk at T-shaped transport container 130
136 connecting device
137, 137' hollow profile
138 rear wall of transport container 130
139 quick release locking system
140 locking device
141 mounting plate
142 locking bar, pin-shaped locking bar
143 enveloping surface of pin
144 pin groove
145 alternative locking bar
146 arm of angle piece
147 other arm of angle piece
148 bore hole
150 lock body
151 first side surface of lock body 150
152 second side surface of lock body 150
153 receiving bore hole
154 blocking bore hole
157 blocking member
158 booking member section
159 blocking member sleeve
160 electric motor at locking device 140
161 housing of electric motor 160
162 shaft of electric motor 160
163 lever
164 connecting piece
165 angle piece
166 first arm of angle piece 165
167 rectangular recess
168 second leg of angle piece 165
169 pass through opening
170 alternative electric motor at locking device 140
171 housing of electric motor 170
172 stop
173 spindle
174 feed nut

The invention claimed is:

1. A three-wheeled electric vehicle according to EG Vehicle Class L2e-U, the three-wheeled electric vehicle comprising:
 a rigid self-supporting body configured in a frame construction, wherein frame elements of the body include round profile metal tubes and hollow rectangular profiles which are welded together;
 a telescopic suspension fork pivotably mounted at a front end of the body;
 a front wheel;
 a handle bar with various operating elements including a brake handle and an acceleration twist handle, the handle bar mounted at the telescopic suspension fork:
 two rear wheels each driven by a respective electric wheel hub motor and each supported at the body by a wheel suspension,
 wherein the respective electric wheel hub motor is fixed gearless at each rear wheel for electric propulsion, wherein the respective electric wheel hub motor includes an integrated motor control configured for a maximum nominal continuous power greater than 2 kW and less than 6 kW or for a maximum nominal continuous power of approximately 4 kW,
 wherein each rear wheel of the two ear wheels respectively includes a rear wheel disc brake system which is actuated by a hydraulic medium pressure when the brake handle is pulled to perform a regular hydraulically actuated braking operation of the rear wheel;
 a controller including data storage capability and digital data processing capability mounted on the electric vehicle which ensures that the nominal continuous power supplied by both wheel hub motors in combination does not exceed 4 kW in normal operation;
 wherein the body forms a support structure in a rear vehicle portion, wherein an exchangeable transport container is supportable and securable at the support structure by a quick release fastening system,
 wherein each rear wheel disc brake system includes an integrated electromechanical parking brake controlled by the controller wherein an actuation of the integrated electromechanical parking brake prevents a rotation of each rear wheel and sets a parking brake mode, wherein the quick release fastening system includes one or ore connecting arrangements, wherein each connecting arrangement includes
a locking bar projecting outward from a base wall of the transport container, and
a locking device permanently attached at the support structure and including an adjustable blocking member,
wherein the locking device receives the locking bar of the transport container when the transport container is supported on the support structure and retains the locking bar through the adjustable blocking member that is in a locking bar retaining position where it retains the locking bar wherein the adjustable blocking member is movable from the locking bar retaining position into a locking bar release position distal from the locking bar where it releases the locking bar, and
wherein the adjustable blocking member is only movable from the locking bar retaining position into the locking bar release position when each of the rear wheels is in the parking brake mode.

2. The three-wheeled electric vehicle according to claim 1, further comprising:
an electromechanical parking brake switch arranged at the handle bar (81),
wherein an actuation of the electromechanical parking brake switch assisted by the controller initiates the parking brake mode or deactivates an existing parking brake mode.

3. The three-wheeled electric vehicle according to claim 2,
wherein the locking device includes a locking bar position sensor that detects a presence or non-presence of the locking bar at or in the locking device and generates a locking bar non-presence signal when the locking bar is not present or generates a locking bar presence signal when the locking bar is present and transmits the locking bar presence signal or the locking non-presence signal to the controller,
wherein the locking device includes a blocking member position sensor which generates a blocking member presence signal when the blocking member is in the locking bar retaining position and transmits the blocking member presence signal to the controller,
wherein the controller only deactivates an activated parking brake mode upon an actuation of the parking brake switch
when a locking bar non-presence signal is simultaneously provided to the controller, or
when a locking bar presence signal and a blocking member presence signal is simultaneously provided to the controller.

4. The three-wheeled electric vehicle according to claim 1, further comprising:
a locking rod slidably supported and guided on and along the support structure and including a front end portion that forms the blocking member and a rear end portion distal therefrom forming a handle arranged in an area of a rear wall of the vehicle where the handle can be gripped by an operator who mechanically hand adjusts the locking rod so that the blocking member moves into the locking bar retaining position or the locking bar release position,
wherein the locking bar includes a straight elongated square portion in which a bore is recessed orthogonal to a longitudinal direction of the locking bar,
wherein the blocking member enters into the bore when the blocking member in the locking bar retaining position.

5. A three-wheeled electric vehicle according to EG Vehicle Class L2e-U, the three-wheeled electric vehicle comprising:
a rigid, self-supporting body configured in a frame construction, wherein frame elements of the body include round profile metal tubes and hollow rectangular profiles which are welded together;
a telescopic suspension fork pivotably mounted at a front end of the body;
a front wheel;
a handle bar with various operating elements including a brake handle and an acceleration twist handle, the handle bar mounted at the telescopic suspension fork;
two rear wheels, each driven by a respective electric wheel hub motor and each supported at the body by a wheel suspension,
wherein the respective electric wheel hub motor is fixed gearless at each rear wheel for electric propulsion, wherein the respective electric wheel hub motor includes an integrated motor control configured for a maximum nominal continuous power greater than 2 kW and less than 6 kW, or for a maximum nominal continuous power of approximately 4 kW,
wherein each rear wheel of the two rear wheels respectively including a rear wheel disc brake system which is actuated by a hydraulic medium pressure when the brake handle is pulled to perform a regular, hydraulically actuated braking operation of the rear wheels;
a controller including data storage capability and digital data processing capability mounted on the electric vehicle which ensures that the nominal continuous power supplied by both wheel hub motors in combination does not exceed 4 kW in normal operation,
wherein the body forms a support structure in a rear vehicle portion, wherein an optional exchangeable transport container is supportable and securable at the support structure by a quick release fastening system,
wherein each rear wheel disc brake system includes an integrated electromechanical parking brake controlled by the controller wherein an actuation of the integrated electromechanical parking brake prevents a rotation of each rear wheel and sets a parking brake mode, and
wherein the quick release fastening system includes one or more connecting arrangements, wherein each connecting arrangement
includes a locking bar projecting outward from a base wall of the transport container, and
includes a locking device permanently attached at the support structure and including an adjustable blocking member,
wherein the locking device receives the locking bar of the transport container when the transport container is supported on the support structure, and
wherein the locking device includes a first electric motor or an alternative electric motor controlled by the controller and a blocking member adjustable by the first electric motor or the alternative electric motor, wherein the blocking member is movable into a locking bar retaining position where the blocking member retains the locking bar or into to a locking bar release position distal from the locking bar where the blocking member releases the locking bar, and
wherein the controller ensures that the first electric motor or the alternative electric motor is only able to move the blocking member from the locking bar-retaining position into the locking bar-release position when each rear wheel is in the parking brake mode.

6. The three-wheeled electric vehicle according to claim 5, further comprising:
an electromechanical parking brake switch arranged at the vehicle handle bar,
wherein an actuation of the electromechanical parking brake switch assisted by the controller initiates the parking brake mode or deactivates an existing parking brake mode.

7. The three-wheeled electric vehicle according to claim 5, further comprising:
an electromechanical locking switch arranged at the vehicle handle bar) and switchable by an operator into a lock-on position or into a lock-off position,
wherein a switch position change is supplied to the controller as a locking-state change signal, wherein the controller thereupon activates the respective electric motor so that the respective electric motor moves the blocking member in the lock on position from the locking bar release position into the locking bar retaining position or moves the blocking member in the lock off position from the locking bar retaining position into the locking bar release position.

8. The three-wheeled electric vehicle according to claim 5,
wherein the locking bar includes a straight elongated square portion in which a bore is recessed orthogonal to a longitudinal direction of the locking bar, and
wherein the blocking member enters into the bore when the blocking member s in the locking bar retaining position.

9. The three-wheeled electric vehicle according to claim 8, wherein the straight elongated square portion forms an arm of a 90° degree angle piece and the locking bar includes an additional arm which is aligned parallel to a transport container base wall and fastened thereto.

10. The three-wheeled electric vehicle according to claim 5,
wherein the locking bar forms a straight elongated cylindrical pin, integrally formed on a mounting plate and attachable to a bottom side of a transport container base wall and including a pin enveloping surface in which a circumferential pin groove is recessed,
wherein the locking device includes a lock body including a receiving bore (153) into which the locking bar is configured to enter,
wherein the lock body includes a blocking bore which partially intersects the receiving bore and into which the blocking member is configured to enter and is displaceably guided therein, and
in the locking bar retaining position,
the locking bar is inserted into the receiving bore,
the blocking member is inserted into the blocking bore, and
a blocking member section of the blocking member occupies a common volume section in the receiving bore, in the pin groove and in the blocking bore and thus retains the locking bar in the lock body by positive form locking.

11. The three-wheeled electric vehicle according to claim 5,
wherein the support structure includes a paired arrangement of an upper outer longitudinal beam and an upper inner longitudinal support each extending in a vehicle longitudinal direction above each rear wheel, and
wherein a mounting plate projecting vertically towards the upper outer longitudinal beam is welded to the upper inner longitudinal beam and the lock body of the lock body is fixed at the mounting plate.

12. The three-wheeled electric vehicle according to claim 5, wherein the alternative electric motor included in the locking device drives a spindle which displaces the blocking member.

13. The three-wheeled electric vehicle according to claim 5, wherein the first electric motor included in the locking device includes a motor-driven shaft which pivots a lever which is pivotably coupled to the blocking member by a connecting piece.

14. Three-wheeled electric vehicle according to claim 10,
wherein the locking device includes a locking bar position sensor which detects a presence or non-presence of the locking bar in the locking position in the receiving bore in the lock body, and
in case of the non-presence of the locking bar in the locking position, the locking bar position sensor generates a locking bar non-presence signal and, or in case of the presence of the locking bar in the locking position, the locking par position sensor generates a locking bar presence signal and transmits the locking bar non-presence signal or the locking bar presence signal to the controller.

15. The three-wheeled electric vehicle according to claim 14,
wherein the locking device includes a blocking member position sensor,
wherein the blocking member position sensor in the presence of the blocking member in the locking bar retaining position generates a blocking member-presence signal and transmits the blocking member-presence signal to the controller.

16. The three-wheeled electric vehicle according to claim 15, further comprising:
an electromechanical parking brake switch arranged at the vehicle handle bar,
wherein an actuation of the electromechanical parking brake switch assisted by the controller initiates the parking brake mode or deactivates an existing parking brake mode,
wherein the controller causes a deactivation of an activated parking brake mode upon an actuation of the parking brake switch by an operator only
when a locking bar non-presence signal is simultaneously provided to the controller, or
when a locking bar presence signal and a blocking member presence signal is simultaneously provided to the controller.

17. The three-wheeled electric vehicle according to claim 1,
wherein the brake handle is pivotably mounted at the vehicle handle bar so that pivoting the brake handle causes a two-fold braking effect,
wherein initial pivoting of the brake handle causes an actuation of an electric brake switch, which in turn generates an electric brake signal, which is supplied to the controller, which in turn generates an electric motor brake signal, which is supplied to the integrated motor control, which in turn controls each electric wheel hub motor into a motor brake mode in which vehicle motion energy is recuperatively converted into electric energy which is supplied to vehicle batteries in a motor brake mode, and wherein further pivoting of the brake handle builds up hydraulic medium pressure, which is supplied via hydraulic medium lines to the rear wheel disc brake systems to perform a regular, hydraulically effected braking operation of the rear wheels, and wherein actuation of a parking brake switch by the operator causes the controller to check a current vehicle speed and to activate the electromechanical parking brakes in both rear wheel disc brake systems in order to put both rear wheels into a parking brake mode in which a rotation of the rear wheels is prevented at a vehicle speed equal to/less than 2 km/h.

18. The three-wheeled electric vehicle according to claim 5, wherein the brake handle is pivotably mounted at the vehicle handle bar so that pivoting the brake handle causes a two-fold braking effect, wherein initial pivoting of the brake handle causes an actuation of an electric brake switch, which in turn generates an electric brake signal, which is supplied to the controller, which in turn generates an electric motor brake signal, which is supplied to the integrated motor control, which in turn controls each electric wheel hub motor into a motor brake mode in which vehicle motion energy is recuperatively converted into electric energy which is supplied to vehicle batteries in a motor brake mode, and wherein further pivoting of the brake handle builds up hydraulic medium pressure, which is supplied via hydraulic medium lines to the rear wheel disc brake systems to perform a regular, hydraulically effected braking operation of the rear wheels, and wherein actuation of a parking brake switch by the operator causes the controller to check a current vehicle speed and to activate the electromechanical parking brakes in both rear wheel disc brake systems in order to put both rear wheels into a parking brake mode in which a rotation of the rear wheels is prevented at a vehicle speed equal to/less than 2 km/h.

* * * * *